United States Patent
Dinan

(10) Patent No.: US 10,206,184 B2
(45) Date of Patent: *Feb. 12, 2019

(54) POWER HEADROOM REPORT IN A WIRELESS DEVICE WITH CARRIER AGGREGATION

(71) Applicant: Esmael Hejazi Dinan, Herndon, VA (US)

(72) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,632

(22) Filed: Dec. 8, 2017

(65) Prior Publication Data
US 2018/0279234 A1 Sep. 27, 2018

Related U.S. Application Data

(63) Continuation of application No. 15/470,145, filed on Mar. 27, 2017, now Pat. No. 9,844,009, which is a (Continued)

(51) Int. Cl.
*H04W 52/36* (2009.01)
*H04W 24/02* (2009.01)
(Continued)

(52) U.S. Cl.
CPC ......... *H04W 52/365* (2013.01); *H04L 69/161* (2013.01); *H04W 24/02* (2013.01);
(Continued)

(58) Field of Classification Search
CPC ........................ H04W 52/365; H04W 52/242
(Continued)

(56) References Cited

U.S. PATENT DOCUMENTS

2011/0243016 A1* 10/2011 Zhang ................ H04W 52/365
370/252
2013/0064131 A1 3/2013 Kwon et al.
(Continued)

OTHER PUBLICATIONS

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
(Continued)

*Primary Examiner* — John J Lee
(74) *Attorney, Agent, or Firm* — David Grossman; Esmael Dinan; Kavon Nasabzadeh

(57) ABSTRACT

A wireless device transmits a power headroom report media access control control element (PHR MAC CE). The PHR MAC CE comprises a presence field comprising a plurality of presence bits. The presence field is of a fixed size of one octet when up to seven of the one or more secondary cells are each configured with a cell index having a value between one and seven. The presence field is of a fixed size of four octets when the one or more secondary cells comprise more than seven secondary cells with configured uplinks.

20 Claims, 23 Drawing Sheets

Related U.S. Application Data continuation of application No. 15/099,537, filed on Apr. 14, 2016, now Pat. No. 9,609,605.

(60) Provisional application No. 62/148,021, filed on Apr. 15, 2015.

(51) Int. Cl.
*H04W 24/10* (2009.01)
*H04W 72/04* (2009.01)
*H04W 52/58* (2009.01)
*H04L 29/06* (2006.01)

(52) U.S. Cl.
CPC ......... *H04W 24/10* (2013.01); *H04W 52/367* (2013.01); *H04W 52/58* (2013.01); *H04W 72/0446* (2013.01)

(58) Field of Classification Search
USPC ............... 455/67.11, 522, 69, 452.1, 509, 68
See application file for complete search history.

(56) References Cited

U.S. PATENT DOCUMENTS

| | | | |
|---|---|---|---|
| 2015/0189606 A1 | 7/2015 | Kim et al. | |
| 2016/0057712 A1* | 2/2016 | Wen | H04W 52/365 370/329 |
| 2016/0242128 A1* | 8/2016 | Loehr | H04W 52/34 |

OTHER PUBLICATIONS

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.
3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.
3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.
3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.
3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.
3GPP TSG RAN WG2 #89bis R2-151622, Apr. 20 to 24, 2015, Bratislava, Slovakia, Source: Samsung, Title: New format for PHR MAC CE format.
3GPP TSG RAN WG2 #89bis, R2-151620, Apr. 20 to 24, 2015, Bratislava, Slovakia, Agenda Item: 72.3, Source: Samsung, Title: New format for Activation/Deactivation Mac Control Element.
3GPP TSG-RAN WG2 #89 R2-150113, Feb. 9-13, 2015, Athens, Greece, Source: NTT DOCOMO, Inc., Title: Discussion on CA beyond 5CCs.
3GPP TSG-RAN WG2 #89bis R2-151129, Apr. 20-24, 2015 Revision of R2-150113, Bratislava, Slovakia, Source: NTT DOCOMO, Inc., Title: Discussion on CA beyond 5CCs.
3GPP TSG-RAN WG2 #89bis Tdoc R2-151506, Bratislava, Slovakia, Apr. 20-24, 2015, Source: Ericsson, Title: MAC CE impact due to CA enhancements.
3GPP TSG-RAN WG2 Meeting #89bis R2-151378, Bratislava, Slovakia, Apr. 20-24, 2015, Source: Nokia Networks, Title: MAC impacts from CA enhancement for more than 5 CCs.
3GPP TSG-RAN WG2 Meeting #89bis R2-151650, Bratislava, Slovakia, Apr. 20-Apr. 24, 2015, Source: LG Electronics Inc., Title: PHR format for eCA.
3GPP TSG-RAN WG2 Meeting #89bls, Bratislava, Slovakia, Apr. 20-24, 2015, R2-151345, Agenda item:7. 2.3, Source: Huawei, HiSiiicon, Title: User Plane impacts due to the introduction of 32 CCs.

* cited by examiner

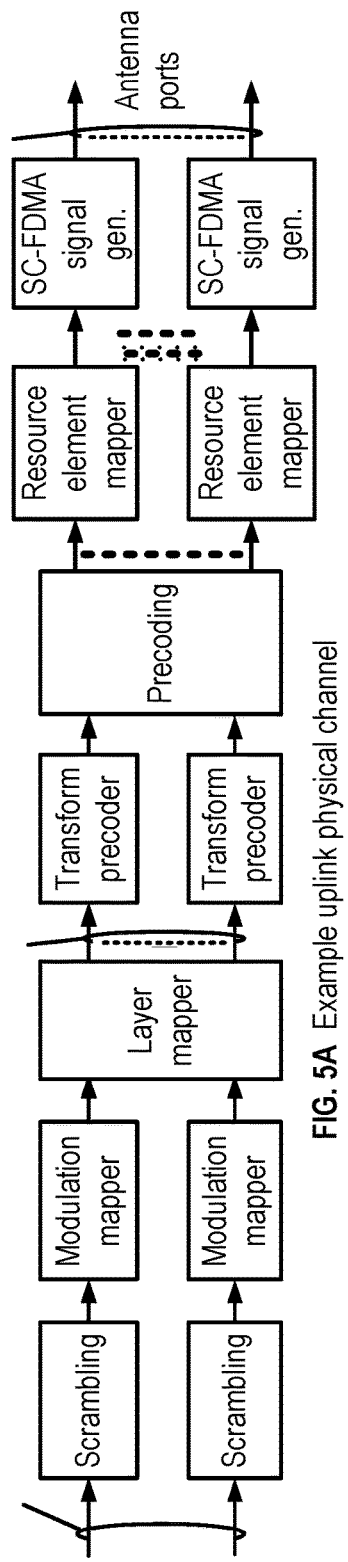
FIG. 5A Example uplink physical channel
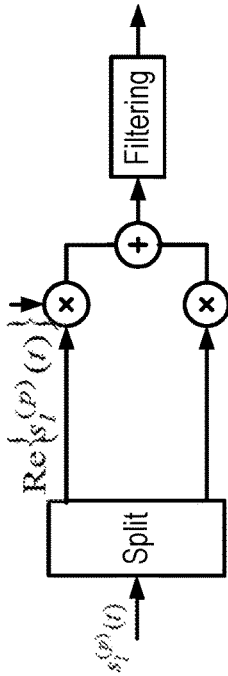
FIG. 5B Example uplink modulation
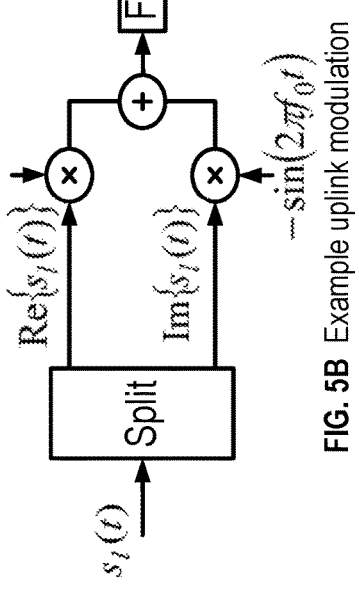
FIG. 5D Example downlink modulation
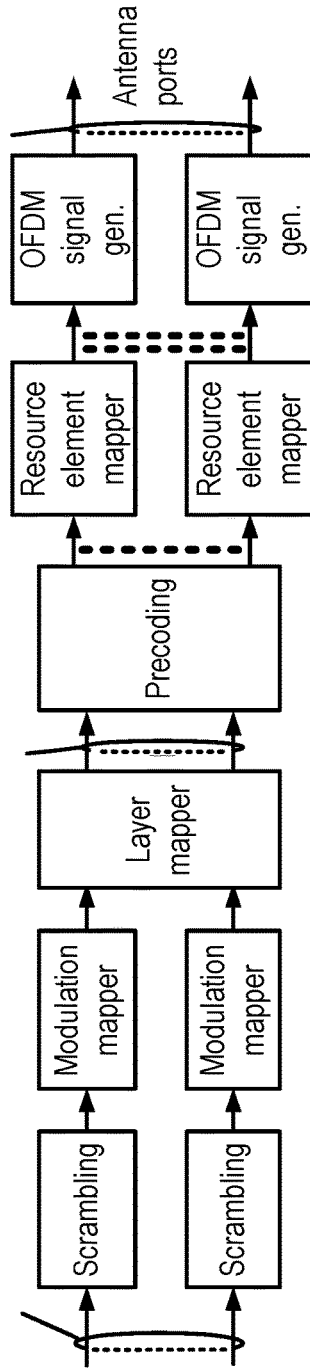
FIG. 5C Example downlink physical channel Dual-Connectivity at eNB

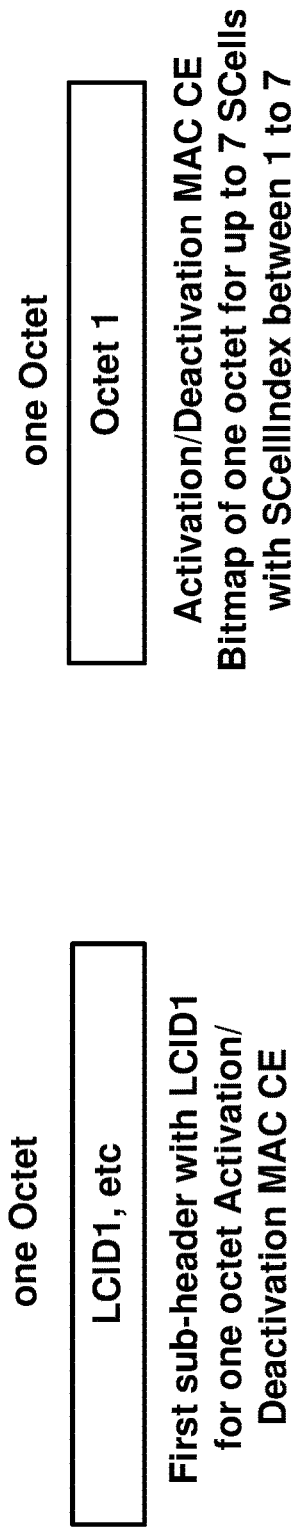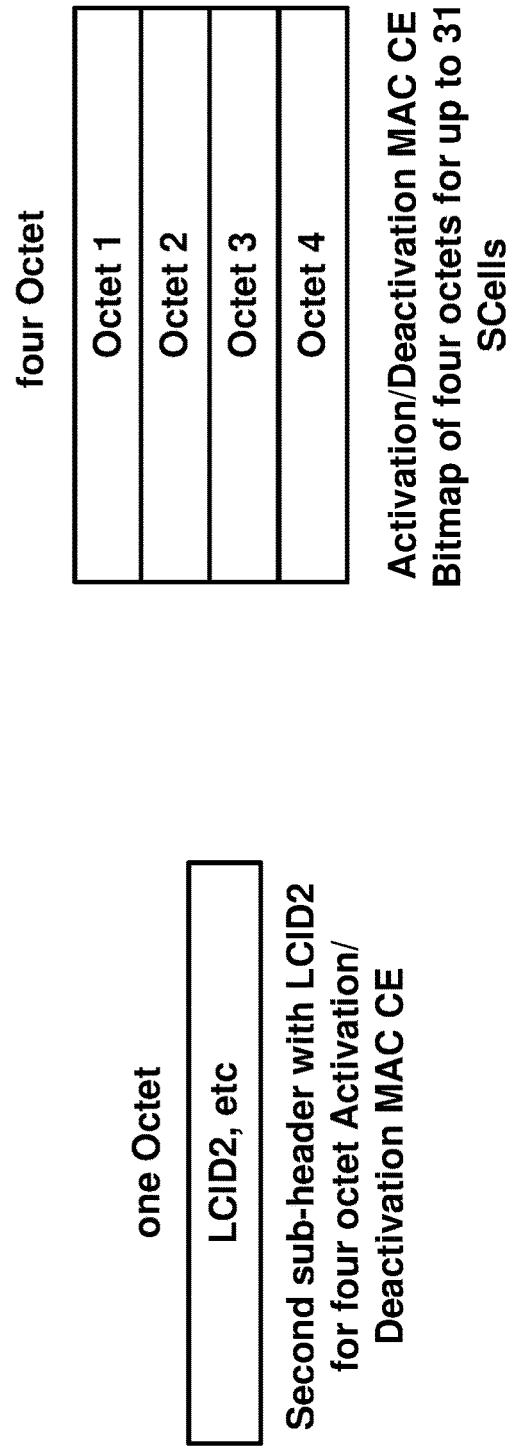
FIG. 16A
FIG. 16B

One octet presence field for PHR MAC CE

Four octet presence field for PHR MAC CE

Power headroom report MAC CE with four octets presence bits

Power headroom report MAC CE with one octet presence bits

POWER HEADROOM REPORT IN A WIRELESS DEVICE WITH CARRIER AGGREGATION

CROSS-REFERENCE TO RELATED APPLICATIONS

This application is a continuation of U.S. patent application Ser. No. 15/470,145, filed Mar. 27, 2017, which is a continuation of U.S. Pat. No. 9,609,605, issued Mar. 28, 2017, which claims the benefit of U.S. Provisional Application No. 62/148,021, filed Apr. 15, 2015, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIGS. 16A and 16B are examples of LCID and MAC CE as per an aspect of an example embodiment.

DETAILED DESCRIPTION OF EMBODIMENTS

Figure 1:
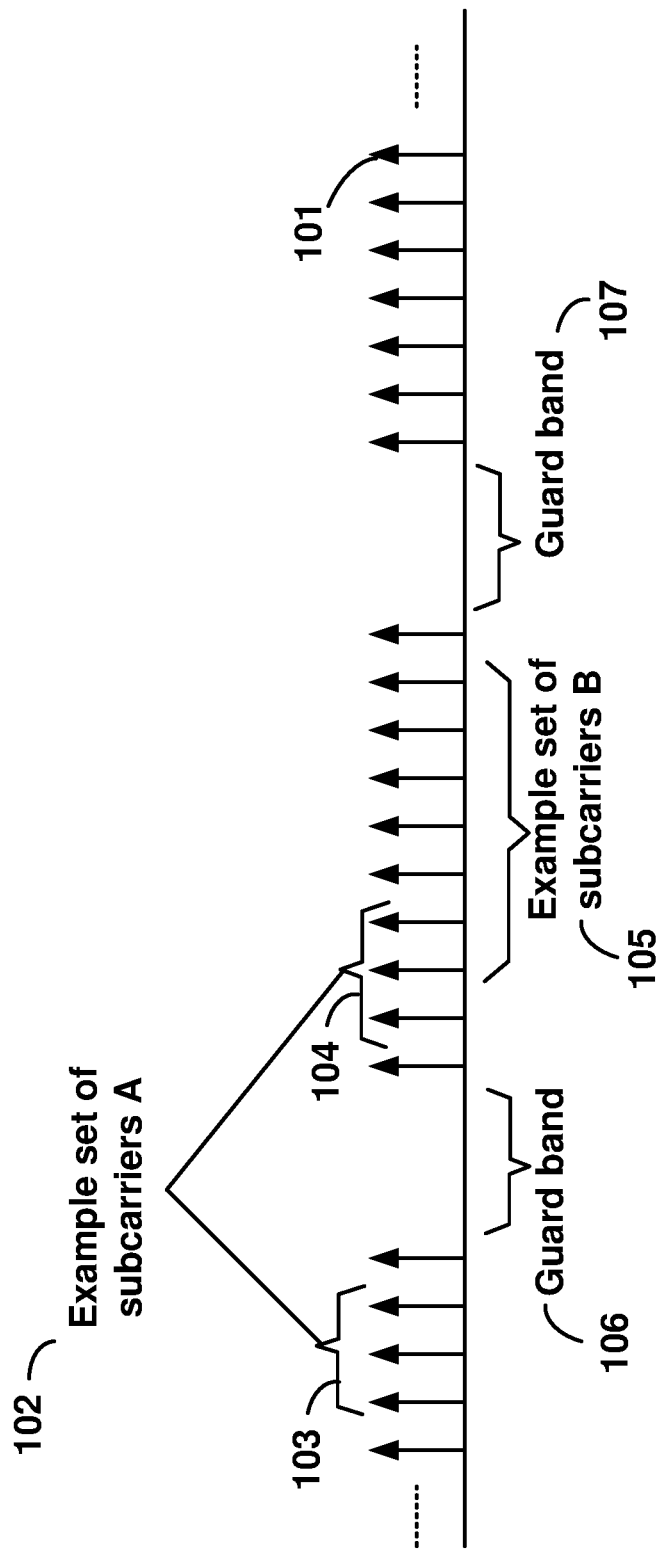
FIG. 1 is a diagram depicting example sets of OFDM subcarriers as per an aspect of an embodiment of the present invention.

Example embodiments of the present invention enable operation of carrier aggregation in a wireless network. Embodiments of the technology disclosed herein may be employed in the technical field of multicarrier communication systems. More particularly, the embodiments of the technology disclosed herein may relate to operation of media access control in a wireless network employing carrier aggregation.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
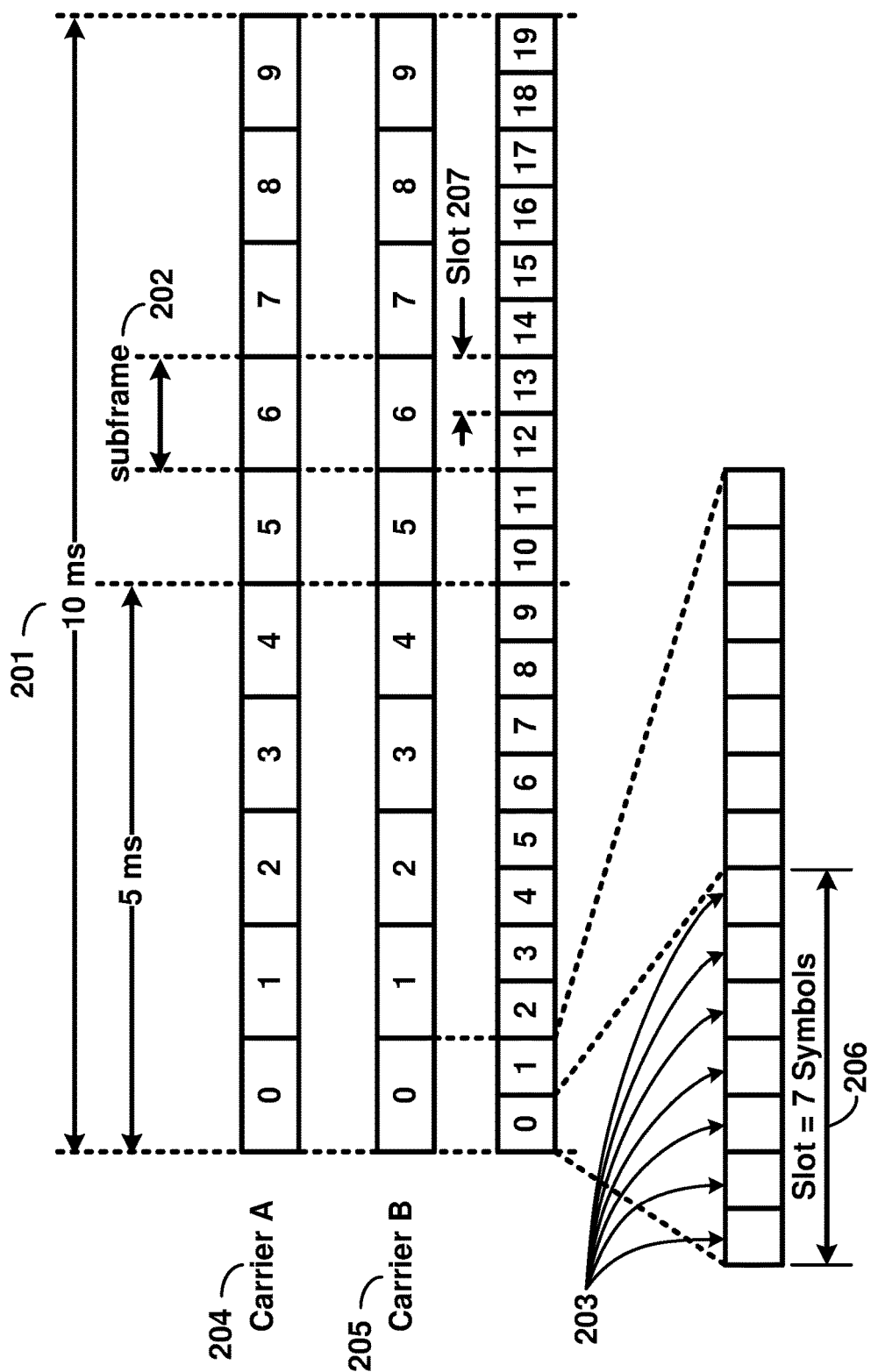
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
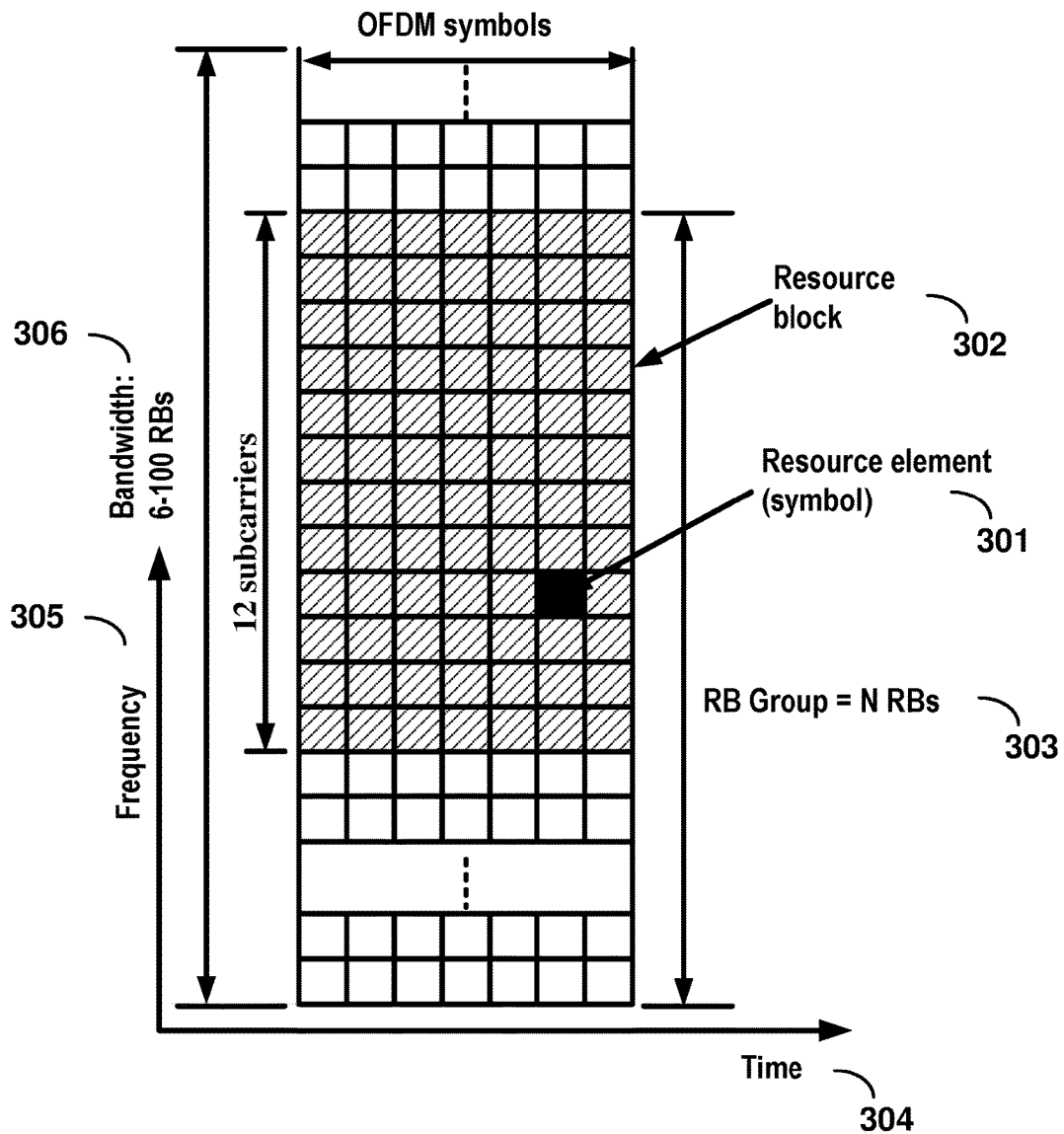
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
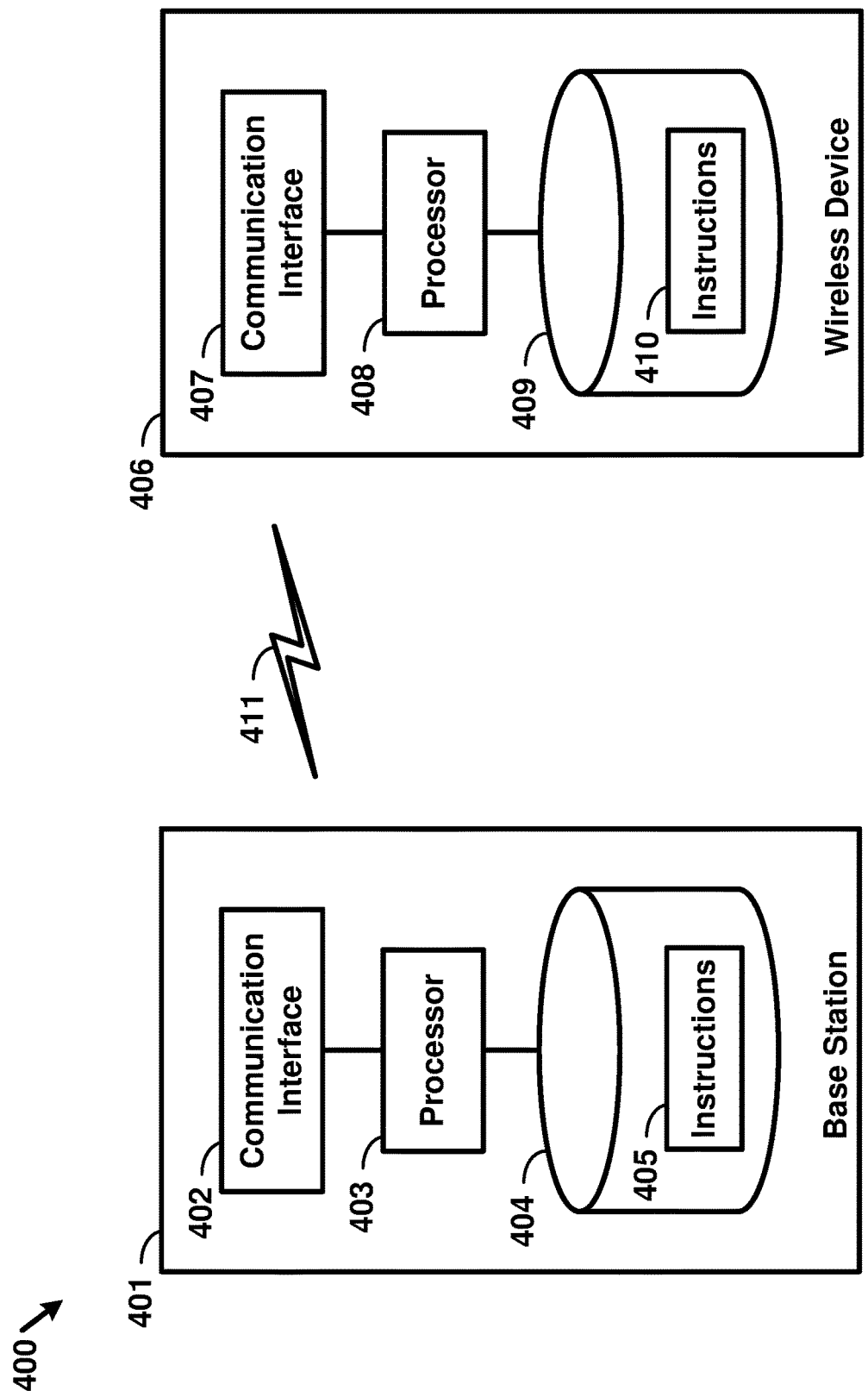
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
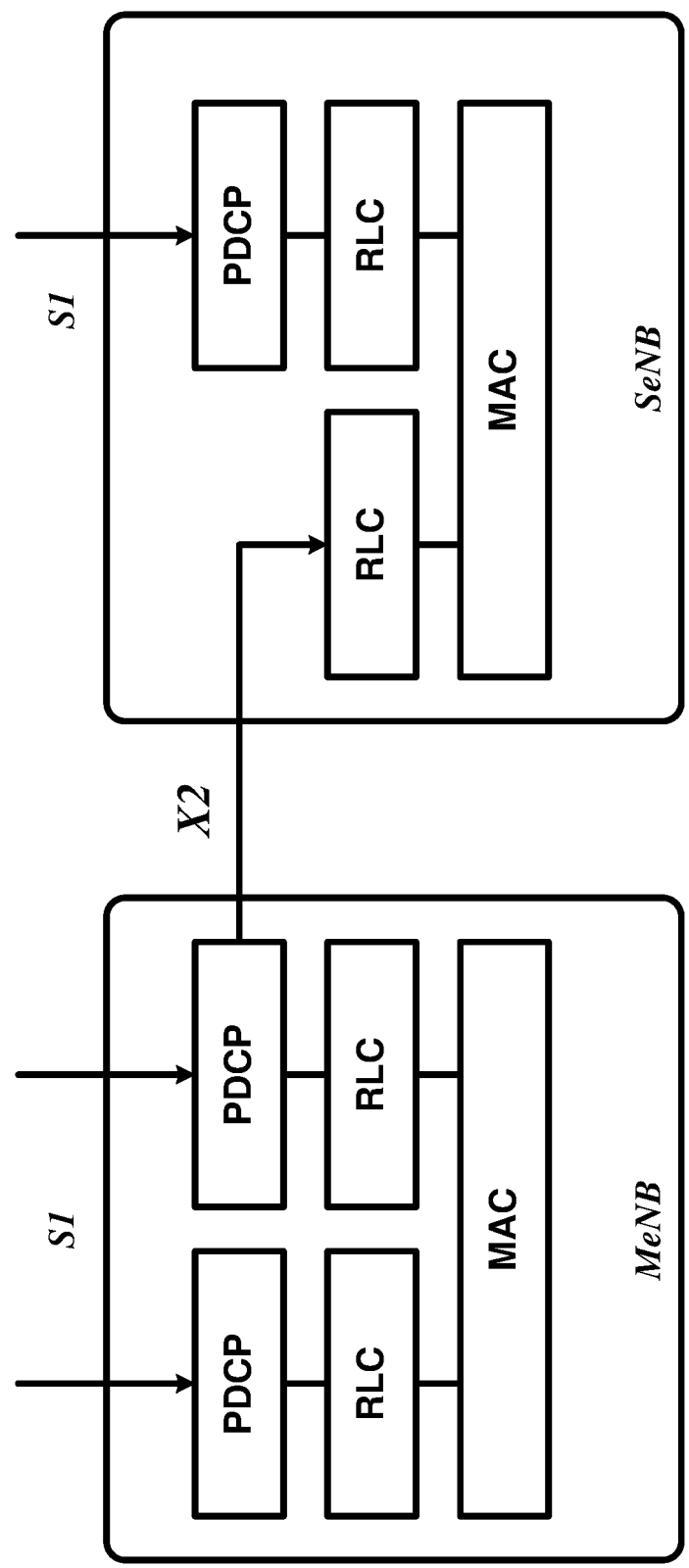
FIG. 6 is an example diagram for a protocol structure with CA and DC as per an aspect of an embodiment of the present invention.
Figure 7:
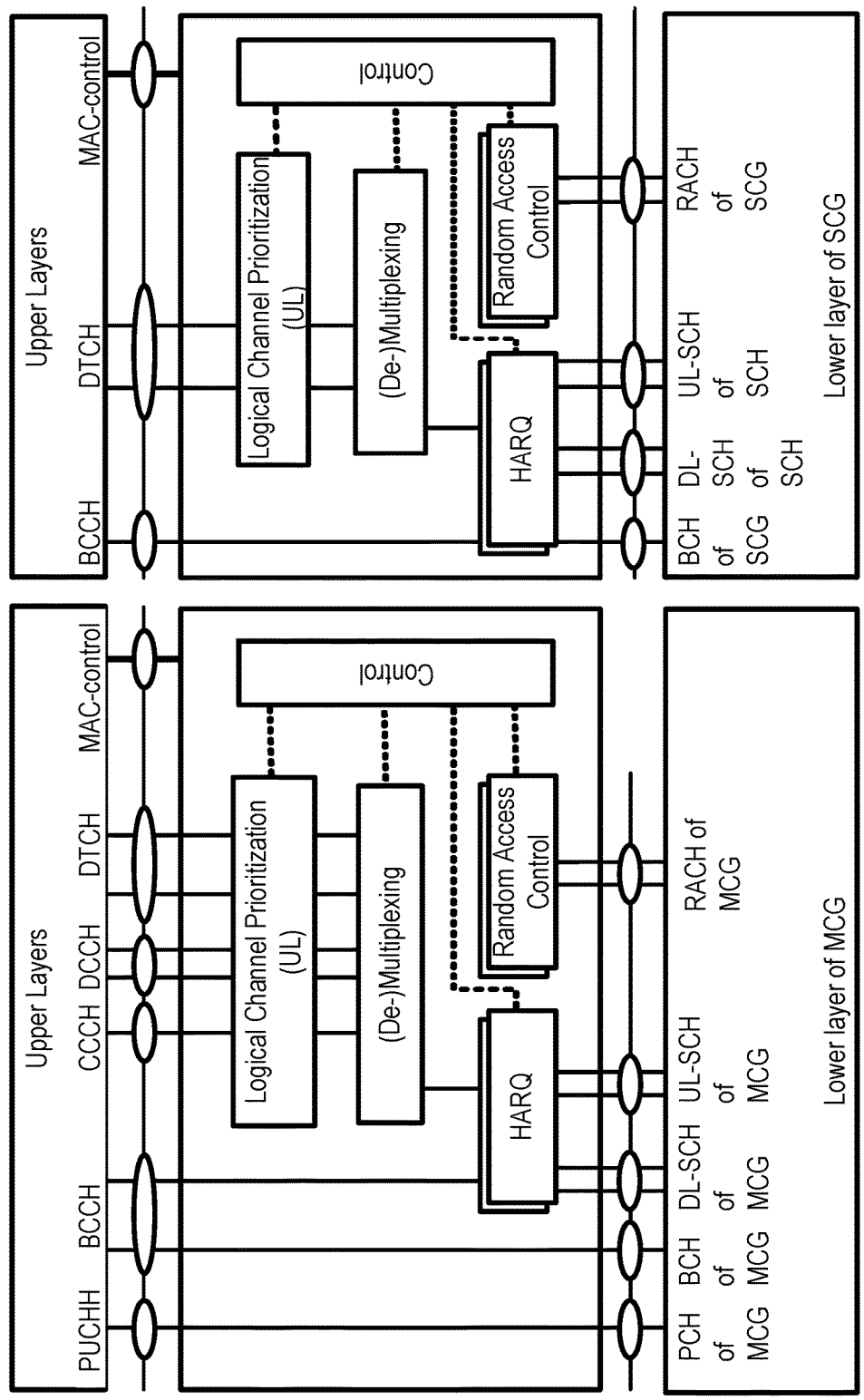
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

Figure 8:
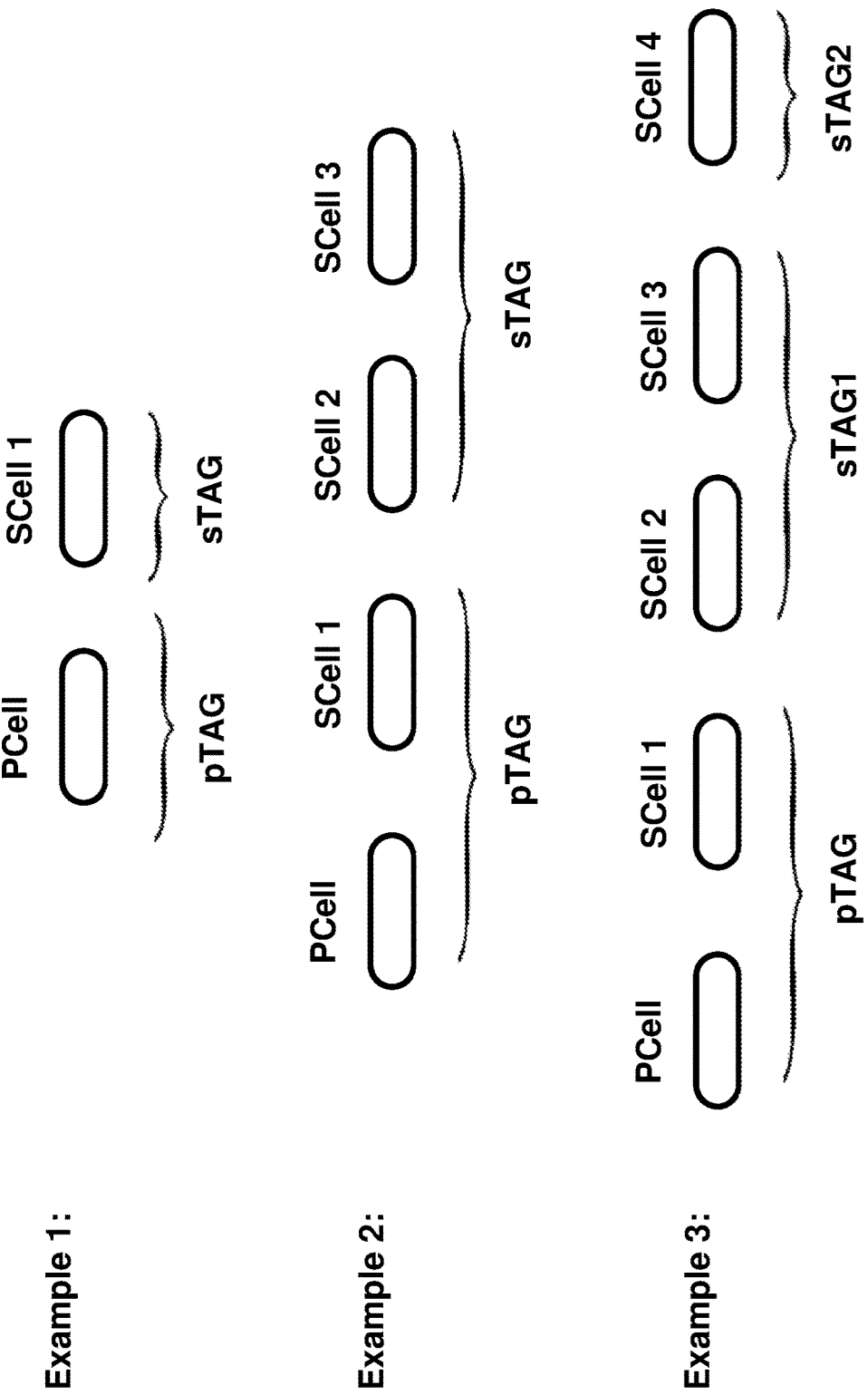
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
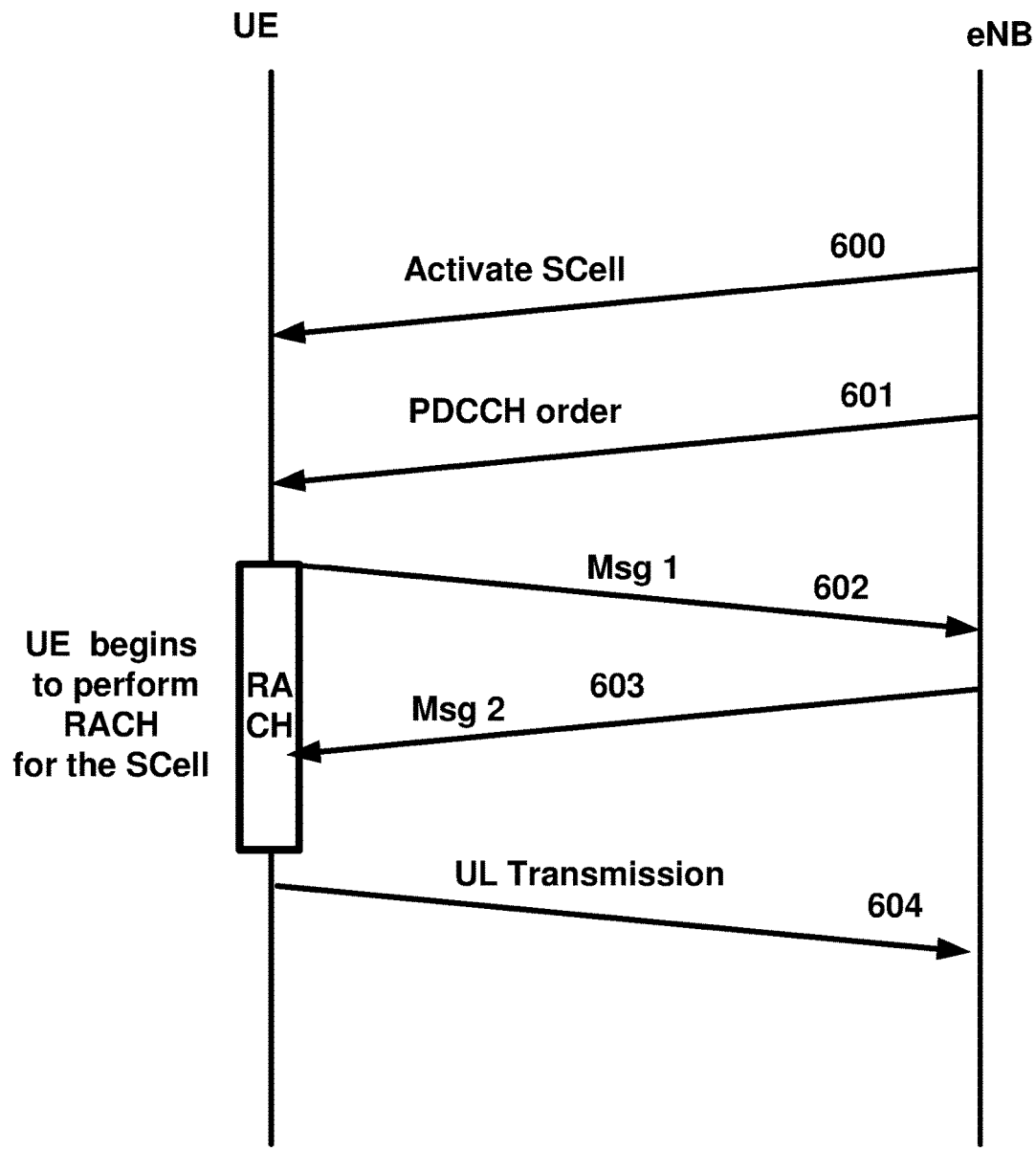
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
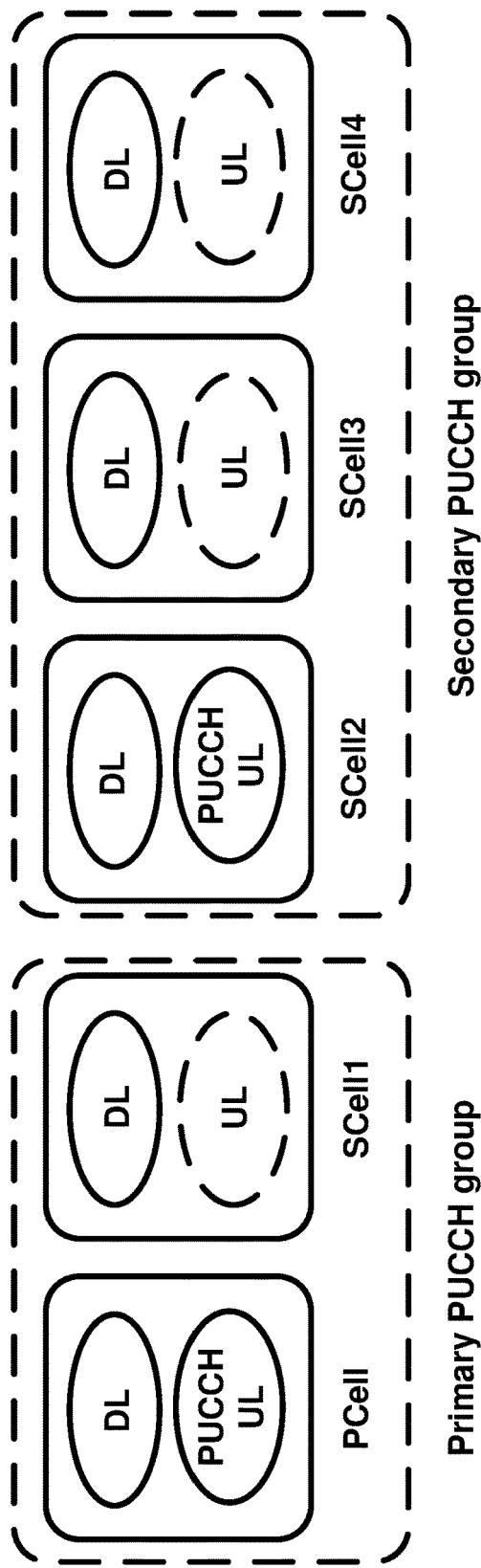
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
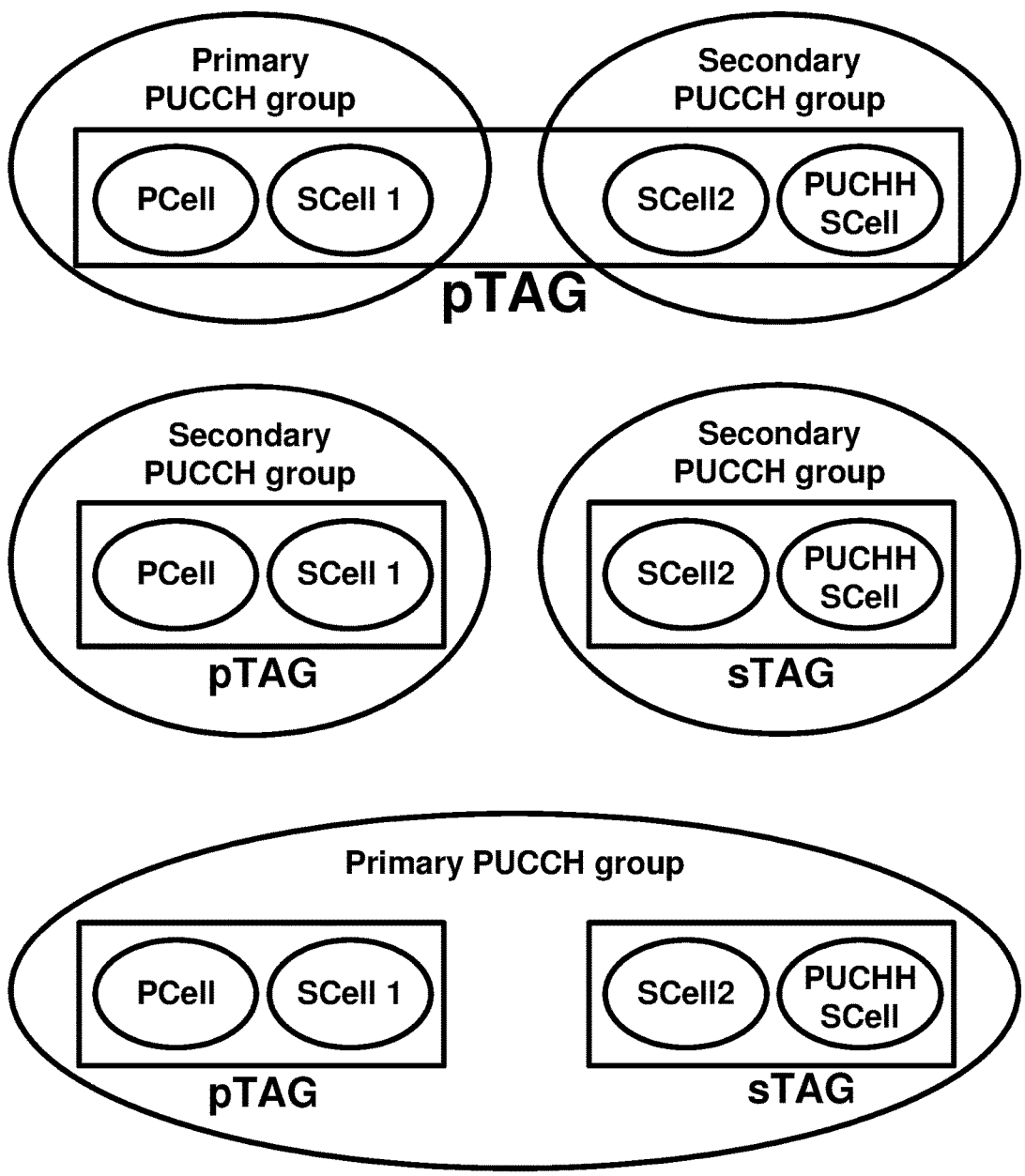
FIG. 11 illustrates example groupings of cells into one or more PUCCH groups and one or more TAGs as per an aspect of an embodiment of the present invention.
Figure 12:
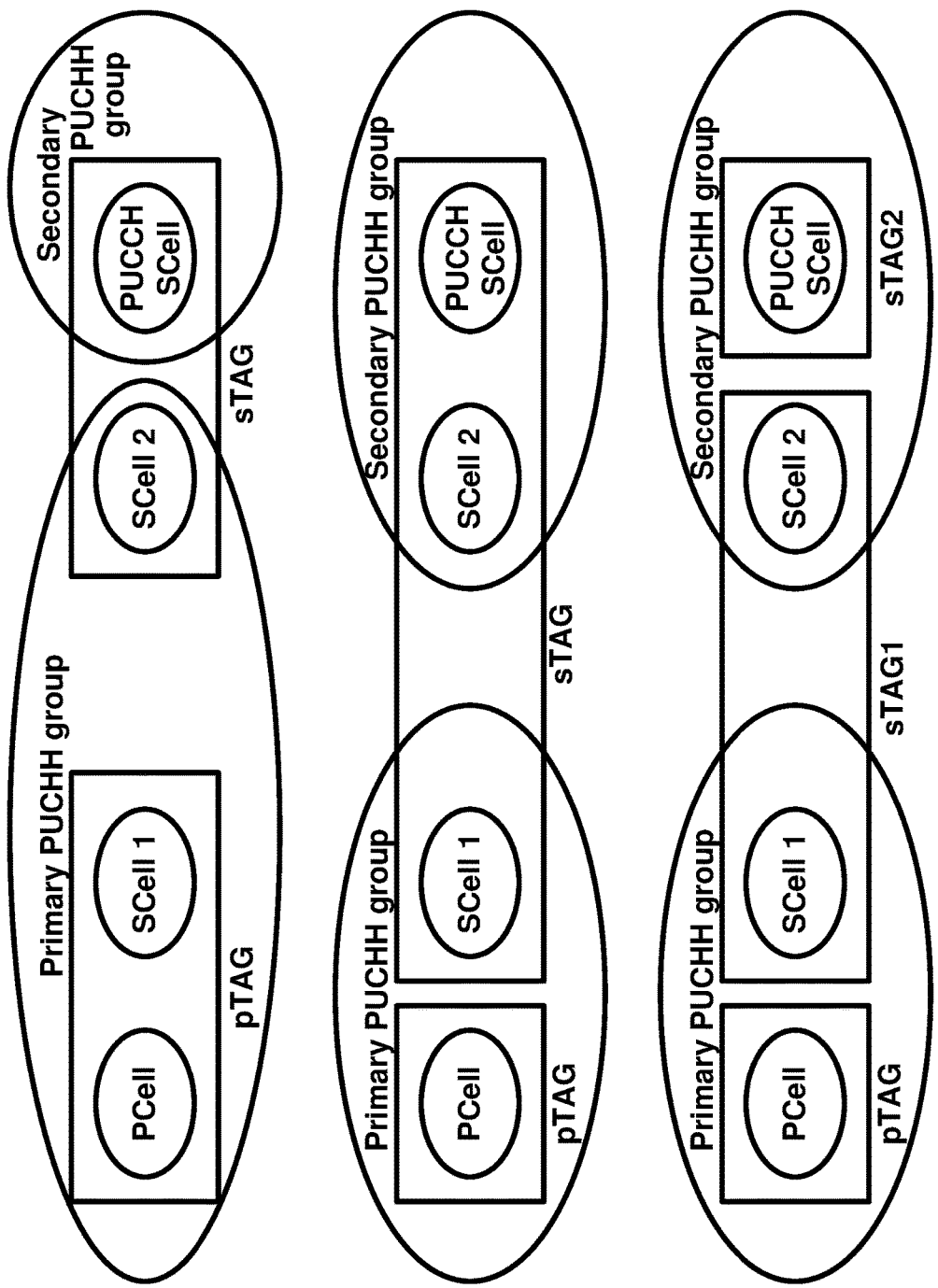
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
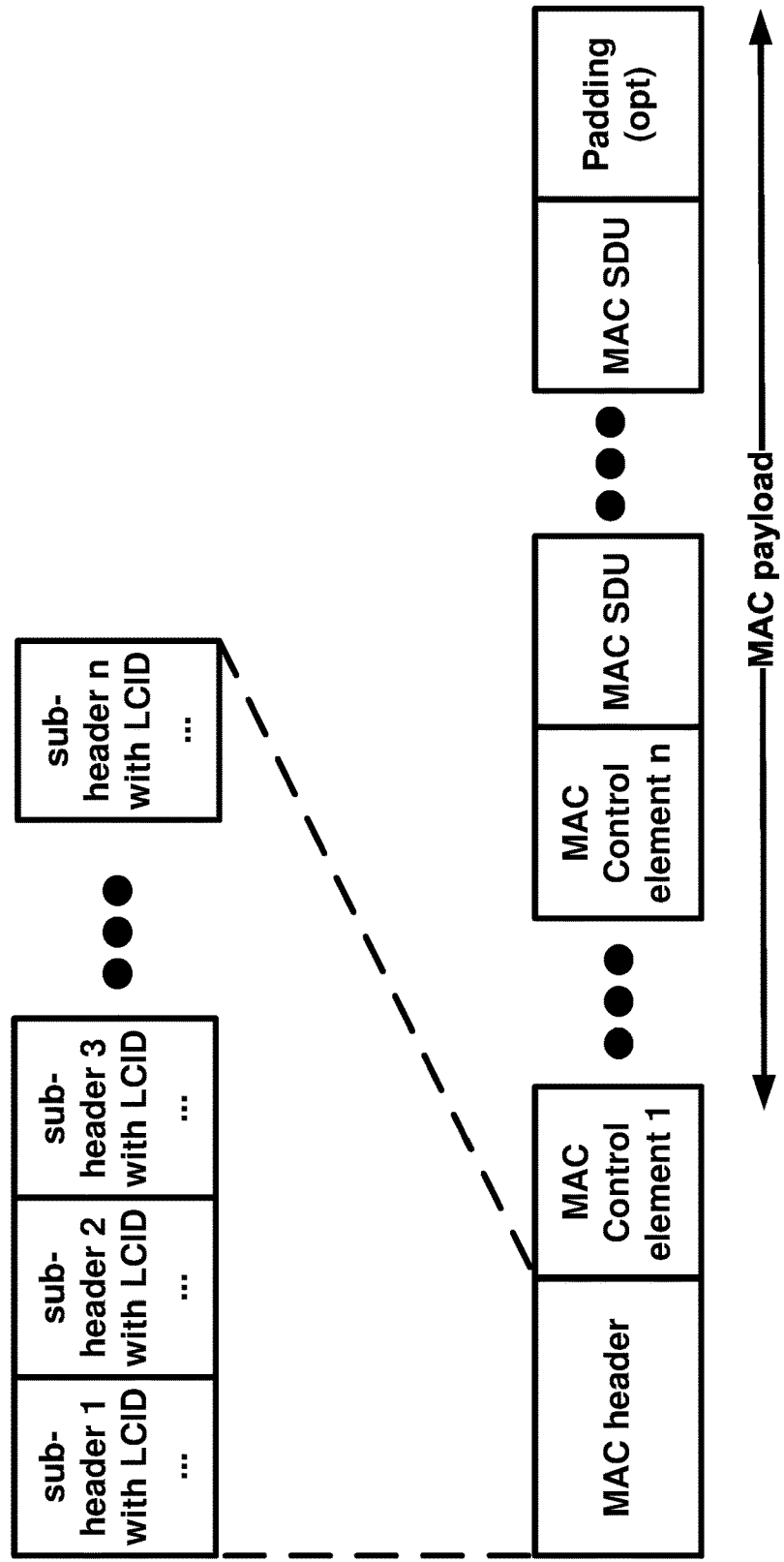
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 ... 98); nCS-AN: INTEGER (0 ... 7); and/or n1PUCCH-AN: INTEGER (0 ... 2047). The parameter deltaPUCCH-Shift ($\Delta_{shift}^{PUCCH}$), nRB-CQI ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE{release: NULL, setup: SEQUENCE {repetitionFactor: ENUMERATED {n2, n4, n6, spare 1}, n1PUCCH-AN-Rep: INTEGER (0 ... 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter ($N_{ANRep}$). n1PUCCH-AN-Rep parameter may be $n_{PUCCH, ANRep}^{(1,\tilde{p})}$ for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running. A timer can be started if it is not running or restarted if it is running. For example, a timer may be started or restarted from its initial value.

In an example embodiment of the invention, if the MAC entity is configured with one or more SCells, the network may activate and deactivate the configured SCells. The SpCell may always be activated when it is configured. The network may activate and deactivate the SCell(s) by sending the Activation/Deactivation MAC control element. Furthermore, the MAC entity may maintain a sCellDeactivationTimer timer for a configured SCell. The same initial timer value applies to an instance of the sCellDeactivationTimer and it is configured by RRC. The configured SCells may be initially deactivated upon addition and after a handover.

The MAC entity may for a TTI and for a configured SCell: if the MAC entity receives an Activation/Deactivation MAC control element in this TTI activating the SCell, the MAC entity may in the TTI according to a pre-defined timing perform one or more of the following: activate the SCell; e.g. apply normal SCell operation, Normal SCell operation may include: SRS transmissions on the SCell; CQI/PMI/RI/PTI reporting for the SCell; PDCCH monitoring on the SCell; PDCCH monitoring for the SCell; PUCCH transmissions on the SCell, if configured. When UE receives an activation MAC C/E, the UE may start or restart the sCellDeactivationTimer associated with the SCell. When UE receives an activation MAC C/E, the UE may trigger PHR.

In an example embodiment, the following processes may be implemented in the UE and/or eNB when an SCell (e.g. PUCCH SCell or other SCells in a PUCCH cell group) is deactivated. Signals are applied to the process if they are configured. Other similar processes may be developed to achieve substantially the same outcome. If an SCell is deactivated, a UE may not transmit SRS on the SCell; may not report CQI/PMI/RI/PTI for the SCell; may not transmit on UL-SCH on the SCell; may not transmit on RACH on the SCell; may not monitor the PDCCH on the SCell; and/or may not monitor the PDCCH for the SCell. HARQ feedback for the MAC PDU containing Activation/Deactivation MAC control element may not be impacted by PCell interruption due to SCell activation/deactivation. When an SCell is deactivated, an ongoing Random Access procedure on the SCell, if any, may be aborted.

Figure 14A:
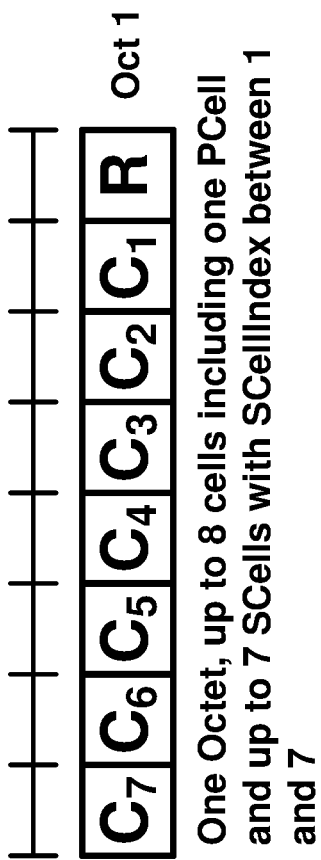
FIGS. 14A and 14B are examples activation/deactivation MAC CE as per an aspect of an example embodiment.

FIG. 14A is an example activation/deactivation MAC CE as per an aspect of an example embodiment. FIG. 14A shows a MAC activation/deactivation CE when up to 7 SCells with SCellIndex between 1 to 7 are configured. The MAC activation/deactivation CE in FIG. 14A may activate or deactivate up to 7 SCells, and when SCellIndex is a number between 1 to 7.

The Activation/Deactivation MAC control element in FIG. 14A may be identified by a MAC PDU subheader with a pre-defined LCID. The MAC CE has a fixed size and comprises of a single octet containing seven C-fields and one R-field. The Activation/Deactivation MAC control element may be defined as follows. Ci: if there is an SCell configured with SCellIndex i, this field may indicate the activation/deactivation status of the SCell with SCellIndex i, else the MAC entity may ignore the Ci field. The Ci field is set to "1" to indicate that the SCell with SCellIndex i should be activated. The Ci field is set to "0" to indicate that the SCell with SCellIndex i should be deactivated. R: Reserved bit, set to "0". As shown in the FIG. 14A, the MAC activation/deactivation CE may activate or deactivate up to 7 SCells, and SCellIndex is a number between 1 to 7.

New LCID(s) for Activation/Deactivation MAC CE may need to be defined to enable activation/deactivation of a higher number of cells, for example when up to 31 SCells (when up to 32 cells including one PCell and up to 31 SCells are configured). In an example embodiment, a four Octet Activation/Deactivation MAC CE with a new LCID is defined. The new A/D MAC CE may be assigned a new LCID different from the LCID for the one octet A/D MAC CE.

Example embodiments, may enable a new MAC CE command with a fixed size of 4 octets. This may enable using MAC subheaders with fixed length MAC CEs, which is one byte. Overall, the disclosed embodiment may enable an efficient MAC CE command format with a reduced overall average command size in most cases. The example embodiment of the invention introduces a fixed size MAC CE, which is simple to implement and requires a shorter MAC CE subheader. The preferred MAC CE has less flexibility, but its simplicity and reduced MAC subheader size provides additional advantages.

Figure 15:
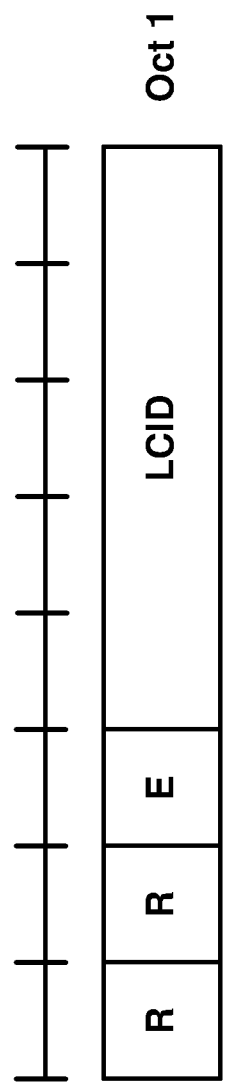
FIG. 15 is an example MAC subheader for a A/D MAC CE as per an aspect of an example embodiment.

FIG. 15 is an example MAC subheader for a A/D MAC CE. The example subheader in the MAC PDU may be employed for fixed sized MAC control elements. The subheader may comprise an LCID field (e.g. five bits). The subheader may include one or more R bits reserved for other or future uses. The subheader may comprise an E field. In an example, E (Extension field) may be a flag indicating if more fields are present in the MAC header or not. The E field may be set to "1" to indicate another set of at least R/R/E/LCID fields. The E field may be set to "0" to indicate that either a MAC SDU, a MAC control element or padding starts at the next byte.

In an example embodiment, a wireless device may receive at least one message comprising configuration parameters of one or more secondary cells. The wireless device may receive from an eNB an activation/deactivation (A/D) media access control (MAC) control element (CE). The wireless device may activate or deactivate at least one cell according to the A/D MAC CE. The MAC A/D CE is of a fixed size of one octet and is identified by a first subheader with a first logical channel identifier (LCID) when up to seven secondary cells and each with a cell index between one to seven is configured. Otherwise, the MAC A/D CE is of a fixed size of four octets and is identified by a second subheader with a second LCID different from the first LCID.

FIGS. 16A and 16B show examples of LCID and MAC CE for a one octet A/D MAC CE and a four octet A/D MAC CE. The A/D MAC CE of one octet may identified by a MAC PDU subheader with a first LCID (LCID1). A/D MAC CE has a fixed size of a single octet containing seven C-fields and one R-field. An example one octet A/D MAC CE is shown in FIG. 16A. The A/D MAC CE of four octets is identified by a MAC PDU subheader with a second LCID (LCID2) different from a first LCID (LCID1). The A/D MAC CE has a fixed size a four octets containing 31 C-fields and one R-field. An example is shown in FIG. 16B.

In an example embodiment, for the case with no serving cell with a ServCellIndex larger than 7, Activation/Deactivation MAC control element of one octet is applied. In one Octet MAC CE, if there is an SCell configured with SCellIndex i, Ci field indicates the activation/deactivation status of the SCell with SCellIndex i, else the MAC entity may ignore the Ci field. The Ci field is set to "1" to indicate that the SCell with SCellIndex i shall be activated. The Ci field is set to "0" to indicate that the SCell with SCellIndex i shall be deactivated; R: Reserved bit, set to "0".

In an example embodiment, for the case with no serving cell with a ServCellIndex larger than 7, Activation/Deactivation MAC control element of one octet is applied, otherwise Activation/Deactivation MAC control element of four octets is applied.

In an example embodiment, if for example, when cells indicated by one or more of the four Octets in A/D MAC CE are not configured, the one or more octets corresponding to un-configured cells are still transmitted. A UE, may not take any action regarding the bits that corresponds to a cell which is not configured. Cells that are not configured may not be activated/deactivated. In an example embodiment, if no cell in a given subgroup is configured, the UE may ignore the bits in the corresponding octet or the bits in the corresponding octet may be zero. The primary cell is always active, therefore, there is no need to indicate the activation or deactivation of the PCell in subgroup 0 (R bit in Octet 1).

In an example embodiment, for the case with no serving cell with a ServCellIndex larger than 7, Activation/Deactivation MAC control element of one octet is applied. In an example embodiment, when SCellIndex i of greater than 7 is configured, the SCells may be grouped into subgroups. SCellIndex of greater than 7 may be indicated by a subgroup number and a Ci. Up to four subgroups may be configured and SCellIndex=subgroup number*8+Ci. This example embodiment, may reduce an index Ci size to a number below 8. Activation/Deactivation MAC control element of four octets is applied. An octet is applicable to a subgroup. For example, Octet one is applied to the first 7 SCells (ServCellIndex from 1 to 7, and subgroup 0), Octet two is applied to the following 8 SCells (ServCellIndex of 8 to 15, or subgroup 1 & Ci from 0 to 7 in subgroup 1) and Octet three is applied to the following 8 SCells (ServCellIndex of 16 to 23, or subgroup 2 & Ci from 0 to 7 in subgroup 2) so on. An Octet in an Activation/Deactivation MAC CE may correspond to a specific pre-defined subgroup. If an SCell is configured, its corresponding Ci field indicates the activation/deactivation status of the SCell, else the MAC entity may ignore the Ci field. The Ci field is set to "1" to indicate that the corresponding SCell shall be activated. The Ci field is set to "0" to indicate that the corresponding SCell shall be deactivated; R: Reserved bit, set to "0".

If there is an SCell configured with CellIndex i in a given subgroup, Ci field may indicate the activation/deactivation status of the SCell with SCellIndex=subgroup number*8+Ci, else the MAC entity may ignore the Ci field. The Ci field is set to "1" to indicate that the corresponding SCell with SCellIndex=subgroup number*8+Ci in the corresponding subgroup should be activated. The Ci field is set to "0" to indicate that the corresponding SCell should be deactivated.

The MAC activation/deactivation CE in FIG. 14A may activate or deactivate up to 7 SCells, and when SCellIndex is a number between 1 to 7. For the case with no serving cell with a ServCellIndex larger than 7 (e.g. no subgrouping), Activation/Deactivation MAC control element of one octet is applied. In an example embodiment, when one subgroup is configured (e.g. no subgrouping is performed) in a wireless device, the first LCID and a one octet A/D MAC CE may be employed for activation/deactivation of cells.

In an example embodiment, when a cell with SCellIndex of greater than 7 is configured, the MAC activation command may have a fixed size of four octets (e.g. multiple subgroups are configured). The eNB and UE may use a four octet MAC subheader with a second LCID for fixed MAC CE size.

Figures 17A, 17B:
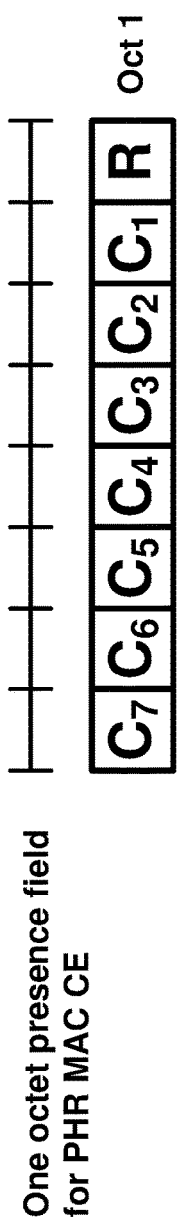
FIGS. 17A and 17B are examples of PHR MAC CE presence fields as per an aspect of an example embodiment.

Example embodiments presents legacy extended PHR MAC CE ((Extended PHR) and enhanced extended PHR MAC CE reports (ExtendedPHR2). FIGS. 17A and 18A show example PHR MAC CE presence fields in an example embodiment. FIGS. 17A and 18A show PHR MAC CE presence field when up to 7 SCells with SCellIndex between 1 to 7 are configured. The PHR MAC CE includes a one-octet presence field. The PHR MAC CE in FIG. 18A may include PHR for up to 7 SCells, and when SCellIndex is a number between 1 to 7. In an example embodiment, when the number of configured secondary cells is less than seven, the PHR MAC CE with one-octet presence field may be employed for PHR of cells.

Figure 18B:
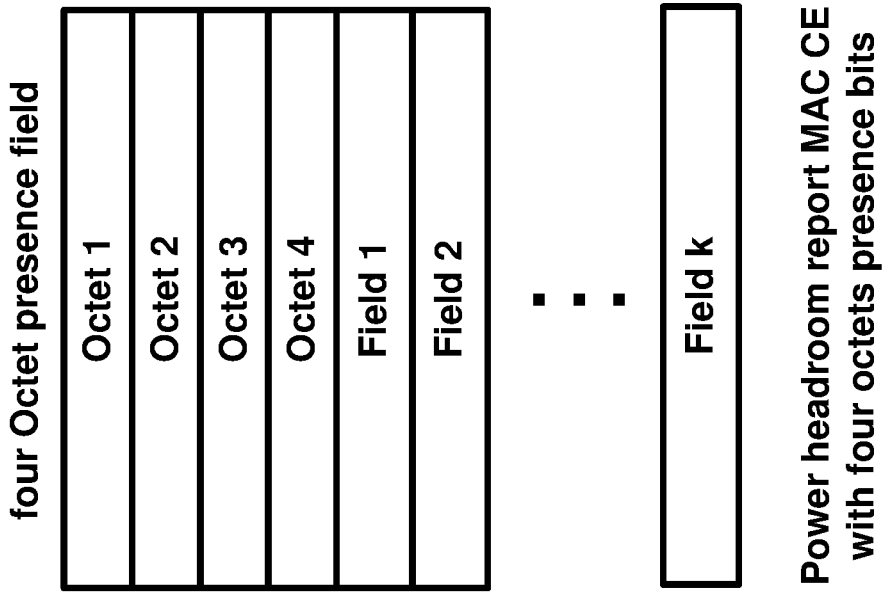
FIGS. 18A and 18B are examples of PHR MAC CE as per an aspect of an example embodiment.
Figure 18A:
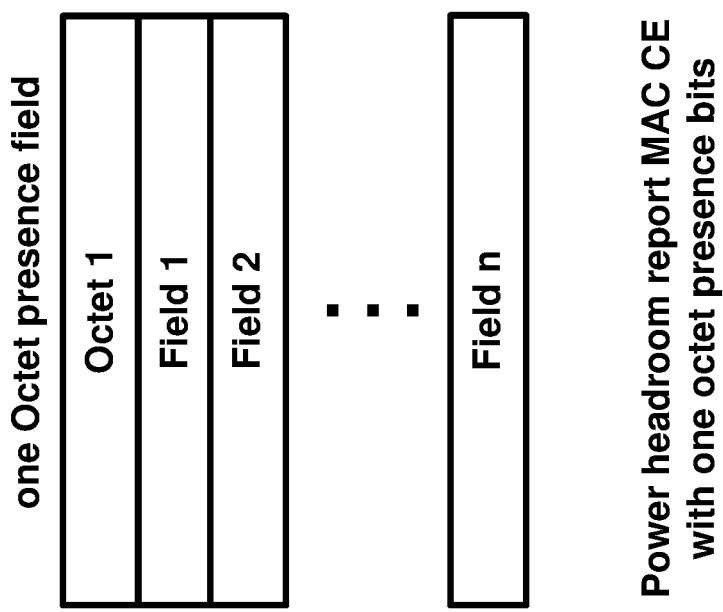

As illustrated in FIGS. 17B and 18B, the presence field are of a fixed size of four octets when the UE is configured with more than seven secondary cells with a configured uplink. In LTE-A and beyond, an eNB may configure a UE with more than seven SCells, each having a configured uplink. A four-octet presence field may be included in the PHR MAC CE as illustrated in FIGS. 17B and 18B.

PHR MAC CE may include either a one-octet presence field or a four-octet presence field depending on RRC configuration of the secondary cells configured in a UE. The example embodiments of the invention introduces two alternative fixed size MAC CE presence field depending on a UE RRC configuration. This mechanism may simplify the UE and/or eNB implementation. The MAC CE format/size has less flexibility, but its simplicity provides additional advantages.

Figure 19:
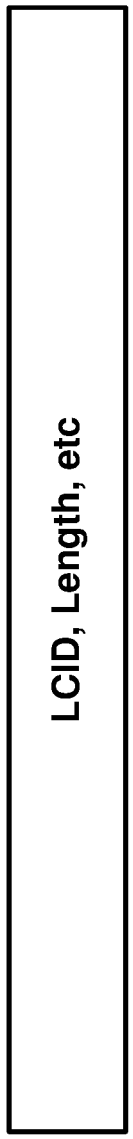
FIG. 19 is an example of PHR MAC CE subheader as per an aspect of an example embodiment.

The PHR MAC CEs in FIGS. 17 and 18 may be identified by a MAC PDU subheader with a pre-defined LCID. FIG. 19 is an example subheader for a PHR MAC CE. The subheader may include a pre-defined LCID field to identify PHR MAC CE. The subheader may also include a length field to indicate the length of the PHR MAC CE. The PHR MAC CE has a variable size depending on the number cells with PHR fields and the type of PHR fields for each cell.

The PHR MAC CE in FIGS. 17A and 18A include presence field with a fixed size. The presence field comprise of a single octet containing seven C-fields and one R-field. The PHR MAC CE in FIGS. 17A and 18A may be defined as follows. Ci: if there is an SCell configured with SCellIndex i, Ci field may indicate whether one or more power headroom fields are report for the SCell with SCellIndex i. The Ci field is set to "1" to indicate that one or more power headroom fields are reported for the SCell with SCellIndex i. The Ci field is set to "0" to indicate that no power headroom report is reported for the SCell with SCellIndex i. As shown in the FIGS. 17A and 18A, the PHR MAC CE may include power headroom for up to 7 SCells with configured uplink and with SCellIndex between 1 to 7.

PHR MAC CE is identified by an LCID in a MAC subheader. The MAC subheader may include an LCID and a Length field. Extended PHR MAC CE has a variable size. In an example embodiment, one octet with C fields may be used for indicating the presence of PH per SCell when the highest SCellIndex of SCell with configured uplink is less than eight (FIGS. 17A and 18A). Four octet with C fields may be used for indicating the presence of PH per SCell when the highest SCellIndex of SCell with configured uplink is greater than seven (FIGS. 17B and 18B). Ci field indicates the presence of a PH field for a corresponding SCell. The Ci field set to "1" indicates that a PH field for the corresponding SCell is reported. The Ci field set to "0" indicates that a PH field for the corresponding SCell is not reported.

FIG. 17B and FIG. 18B show example PHR MAC CE fields, when more than seven SCells with configured uplink are configured. In an example embodiment, when an SCell with configured downlink and uplink and with SCellIndex i of greater than 7 is configured, the SCells may be grouped into up to 4 subgroups. SCellIndex of greater than 7 may be indicated by a subgroup number and a Ci. Up to four subgroups may be configured and SCellIndex=subgroup number*8+Ci. This example embodiment, may reduce index Ci to a number below 8. PHR MAC CE presence field of four octets are applied. An octet is applicable to a subgroup. For example, octet one is applied to the first 7 SCells (ServCellIndex from 1 to 7, and subgroup 0), Octet two is applied to the following 8 SCells (ServCellIndex of 8 to 15, or subgroup 1 & Ci from 0 to 7 in subgroup 1) and Octet three is applied to the following 8 SCells (ServCellIndex of 16 to 23, or subgroup 2 & Ci from 0 to 7 in subgroup 2) so on. An Octet in a PHR MAC CE may correspond to a pre-defined subgroup. If an SCell is configured, its corresponding Ci field indicates the presence of power headroom fields of the SCell in the PHR MAC CE, otherwise no power headroom fields may be included for an SCell that is not configured. The Ci field is set to "1" to indicate that power headroom fields are included for the corresponding SCell. The Ci field is set to "0" to indicate that no power headroom report is included in the corresponding SCell; R is a reserved bit.

If there is an SCell configured with CellIndex i in a given subgroup, Ci field may indicate the presence of power headroom fields of the SCell with SCellIndex=subgroup number*8+Ci, else no power headroom may be included for an un-configured SCell. The Ci field is set to "1" to indicate that one or more power headroom are present for the corresponding SCell with SCellIndex=subgroup number*8+Ci. The Ci field is set to "0" to indicate that no power headroom report is present for the corresponding SCell.

In an example embodiment, when a cell is not configured, the eNB may ignore the bit in the corresponding presence octet. The primary cell is always active, therefore, the PHR for it is always transmitted (e.g. R bit in Octet 1).

E-UTRAN may configure the legacy Extended PHR when more than one and up to eight Serving Cell(s) with uplink is configured and none of the serving cells with uplink configured has a servingCellIndex higher than seven and if PUCCH on SCell is not configured and if dual connectivity is not configured. For extendedPHR, the Extended Power Headroom Report (PHR) MAC control element is identified by a MAC PDU subheader including an LCID. Extended PHR MAC CE has a variable size. When Type 2 PH is reported, the octet containing the Type 2 PH field may be included first after the octet indicating the presence of PH per SCell and followed by an octet containing the associated PCMAX,c field (if reported). Then follows in ascending order based on the ServCellIndex an octet with the Type 1 PH field and an octet with the associated PCMAX,c field (if reported), for the PCell and for each SCell indicated in the bitmap.

Extended Power Headroom Report (ExtendedPHR2) may be configured when any of the serving cells with uplink configured has a servingCellIndex higher than seven. Enhanced Extended Power Headroom Report (PHR) may be configured when PUCCH SCell is configured. Enhanced Extended Power Headroom Report (PHR) MAC control elements are identified by a MAC PDU subheader including an LCID. Extended PHR MAC CE has a variable size. One octet with C fields may be used for indicating the presence of PH per SCell when the highest SCellIndex of SCell with configured uplink is less than 8. Four octet with C fields may be used for indicating the presence of PH per SCell when the highest SCellIndex of SCell with configured uplink is greater than 7.

When Type 2 PH is reported for the PCell, the octet containing the Type 2 PH field may be included first after the octet(s) indicating the presence of PH per SCell and followed by an octet containing the associated PCMAX,c field (if reported). Then follows the Type 2 PH field for the PUCCH SCell (if PUCCH on SCell is configured and Type 2 PH is reported for the PUCCH SCell), followed by an octet containing the associated PCMAX,c field (if reported). Then follows in ascending order based on the ServCellIndex an octet with the Type 1 PH field and an octet with the associated PCMAX,c field (if reported), for the PCell and for each SCell indicated in the bitmap.

Some example Extended PHR MAC CE fields may be defined as follows: V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For both Type 1 and Type 2 PH, V=0 indicates the presence of the octet containing the associated PCMAX,c field, and V=1 indicates that the octet containing the associated PCMAX,c field is omitted. Power Headroom (PH) field indicates the power headroom level. The length of the field is 6 bits. P field indicates whether the MAC entity applies power backoff due to power management (as allowed by P-MPRc). The MAC entity may set P=1 if the corresponding PCMAX,c field would have had a different value if no power backoff due to power management had been applied. PCMAX,c field, if present, indicates the PCMAX,c or $\tilde{P}_{PCMAX,c}$ used for calculation of the preceding PH field.

There may be two types of UE power headroom reports, Type 1 and Type 2. A UE power headroom PH may be valid for subframe i for serving cell c.

If the UE is configured with an SCG, and if a higher layer parameter phr-ModeOtherCG-r12 for a CG indicates 'virtual' for power headroom reports transmitted on that CG, the UE may compute PH assuming that it does not transmit a PUSCH/PUCCH on any serving cell of the other CG.

If the UE is configured with an SCG for computing power headroom for cells belonging to MCG, the term 'serving cell' may refer to a serving cell belonging to the MCG. For computing power headroom for cells belonging to an SCG, the term 'serving cell' may refer to a serving cell belonging to the SCG. The term 'primary cell' may refer to the PSCell of the SCG. If the UE is configured with a PUCCH SCell for computing power headroom for cells belonging to a primary PUCCH group, the term 'serving cell' may refer to a serving cell belonging to the primary PUCCH group. For computing power headroom for cells belonging to a secondary PUCCH group, the term 'serving cell' may refer to serving cell belonging to the secondary PUCCH group. The term 'primary cell' may refer to the PUCCH-SCell of the secondary PUCCH group.

An example Type 1 and Type 2 power headroom calculations is presented here. Example parameters and example calculation method is presented in standard document 3GPP TS 36.213 standard documents of the corresponding LTE release.

Type 1:

If the UE transmits PUSCH without PUCCH in subframe i for serving cell C, power headroom for a Type 1 report may be computed using $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]$$

where, example $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ may be defined as follows. $P_{CMAX,c}(i)$ may be the configured UE transmit power in subframe i for serving cell c and $P_{CMAX,c}(i)$ may be the linear value of $P_{CMAX,c}(i)$. $M_{PUSCH,c}(i)$ may be the bandwidth of the PUSCH resource assignment expressed in number of resource blocks valid for subframe i and serving cell c.

$PL_c$ is, for example, the downlink path loss estimate calculated in the UE for serving cell c in dB and $PL_c$=referenceSignalPower higher layer filtered RSRP, where referenceSignalPower is provided by higher layers. The UE may measure on or more pathloss values employing signals received on one or more pathloss reference cells. A pathloss reference cell may be configured for a serving cell. The UE may calculate $PL_c$ and may employ one or more pathloss values ($PL_c$) for calculation of Type 1 and Type 2 power headroom fields. If serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP. If serving cell c belongs to a TAG containing the PSCell then, for the uplink of the PSCell, the PSCell may be used as the reference serving cell for determining referenceSignalPower and higher layer filtered RSRP. For the uplink of the secondary cell other than PSCell, the serving cell configured by the higher layer parameter pathlossReferenceLinking may be used as the reference serving cell for determining referenceSignalPower and higher layer filtered RSRP.

Po_PUSCH, c(j) may be configured employing RRC configuration parameters. If the UE is configured with higher layer parameter UplinkPowerControlDedicated-v12x0 for serving cell c and if subframe i belongs to uplink power control subframe set 2 as indicated by the higher layer parameter tpc-SubframeSet-r12. For j=0 or 1, $\alpha_c(j)= \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c. For j=2, $\alpha_c(j)$=1. Otherwise: For j=0 or 1, $\alpha_c \in \{0, 0.4, 0.5, 0.6, 0.7, 0.8, 0.9, 1\}$ may be a 3-bit parameter provided by higher layers for serving cell c. For j=2, $\alpha_c(j)$=1; $PL_c$ may be the downlink path loss estimate calculated in the UE for serving cell c in dB and $PL_c$=referenceSignalPower higher layer filtered RSRP, where referenceSignalPower is provided by higher layers and RSRP for the reference serving cell and the higher layer filter configuration for the reference serving cell; $\Delta_{TF,c}(i)=10 \log_{10}((2^{BPRE \cdot K_s}-1) \cdot \beta_{offset}^{PUSCH})$ for $K_s$=1.25 and 0 for $K_s$=0 where $K_s$ is given by the parameter deltaMCS-Enabled provided by higher layers for each serving cell c. BPRE and $\beta_{offset}^{PUSCH}$, for each serving cell c, are computed as below. $K_s$=0 for transmission mode 2; f(i) may be a function of power control commands.

If the UE transmits PUSCH with PUCCH in subframe i for serving cell C, power headroom for a Type 1 report may be computed using:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} [dB]$$

$\tilde{P}_{CMAX,c}(i)$ may be computed assuming a PUSCH only transmission in subframe i. For this case, the physical layer may deliver $\tilde{P}_{CMAX,c}(i)$ instead of $P_{CMAX,c}(i)$ to higher layers. If the UE does not transmit PUSCH in subframe i for serving cell c, power headroom for a Type 1 report may be computed using $$PH_{type1,c}(i) = \tilde{P}_{CMAX,c}(i) - \{P_{O\_PUSCH,c}(1) + \alpha_c(1) + \alpha_c(1) \cdot PL_c + f_c(i)\}[dB]$$

where, example $\tilde{P}_{CMAX,c}(i)$ may be computed assuming MPR=0 dB, A-MPR=0 dB, P-MPR=0 dB and □TC=0 dB.

Type 2:

If the UE transmits PUSCH simultaneous with PUCCH in subframe i for the primary cell, power headroom for a Type 2 report is computed using:

$$PH_{type2}(i) = P_{CMAX,c}(i) - 10\log_{10}$$
$$\left( \begin{array}{l} 10^{(10\log10(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10} \end{array} \right)$$
[dB]

If the UE transmits PUSCH without PUCCH in subframe i for the primary cell, power headroom for a Type 2 report is computed using:

$$PH_{type2}(i) = P_{CMAX,c}(i) - 10\log_{10}$$
$$\left( \begin{array}{l} 10^{(10\log10(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10} \end{array} \right) [dB]$$

where, example $P_{CMAX,c}(i)$ $M_{PUSCH,c}(i)$ $P_{O\_PUSCH,c}(j)$, $\alpha_c(j)$, $\Delta_{TF,c}(i)$ and $f_c(i)$ may be of the primary cell parameters. If the UE transmits PUCCH without PUSCH in subframe i for the primary cell, power headroom for a Type 2 report is computed using:

$$PH_{type2}(i) = P_{CMAX,c}(i) - 10\log_{10}$$
$$\left( \begin{array}{l} 10^{(P_{O\_PUSCH,c}(1)+\alpha_c(1) \cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10} \end{array} \right)$$
[dB]

where, example $P_{O\_PUSCH,c}(1)$, $\alpha_c(1)$ and $f_c(i)$ are the primary cell parameters. If the UE does not transmit PUCCH or PUSCH in subframe i for the primary cell, power headroom for a Type 2 report is computed using:

$$PH_{type2}(i) = \tilde{P}_{CMAX,c}(i) - 10\log_{10}\left( \begin{array}{l} 10^{(P_{O\_PUSCH,c}(1)+\alpha_c(1) \cdot PL_c+f_c(i))/10} + \\ 10^{(P_{0\_PUCCH}+PL_c+g(i))/10} \end{array} \right) [dB]$$

where, example $\tilde{P}_{CMAX,c}(i)$ may be computed assuming MPR=0 dB, A-MPR=0 dB, P-MPR=0 dB and TC=0 dB, $P_{O\_PUSCH,c}(1)$, $\alpha_c(1)$ and $f_c(i)$ are the primary cell parameters. If the UE is unable to determine whether there is a PUCCH transmission corresponding to PDSCH transmission(s) or not, or which PUCCH resource is used, in subframe i for the primary cell, before generating power headroom for a Type 2 report, upon (E)PDCCH detection, with the following conditions: (1) if both PUCCH format 1b with channel selection and simultaneous PUCCH-PUSCH are configured for the UE, or (2) if PUCCH format 1b with channel selection is used for HARQ-ACK feedback for the UE configured with PUCCH format 3 and simultaneous PUCCH-PUSCH are configured, then, UE may be allowed to compute power headroom for a Type 2 using:

$$PH_{type2}(i) = P_{CMAX,c}(i) - 10\log_{10} \left( \begin{array}{c} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH} + PL_c + g(i))/10} \end{array} \right) [dB]$$

where, example $P_{CMAX,c}(i)$, and $M_{PUSCH,c}(i)$, $P_{O\_PUSCH,c}(j)$, $\alpha_c(j)$, $\Delta_{TF,c}(i)$ are $f_c(i)$ the primary cell parameters.

The power headroom may be rounded to the closest value in the range [40; −23] dB with steps of 1 dB and is delivered by the physical layer to higher layers. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE may use $f_{c,2}(i)$ instead of $f_c(i)$ to compute $PH_{type1,c}(i)$ and $PH_{type2,c}(i)$ for subframe i and serving cell c.

Figure 20:
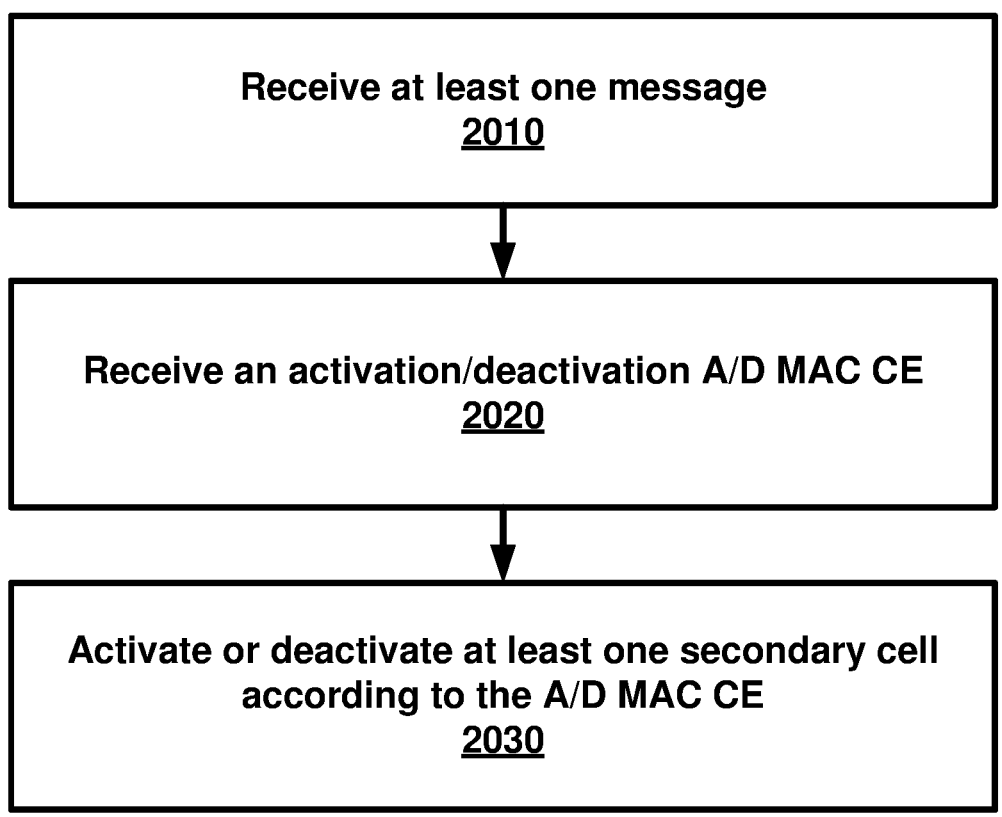
FIG. 20 is an example flow diagram as per an aspect of an embodiment of the present invention.

FIG. 20 is an example flow diagram as per an aspect of an embodiment of the present invention. A wireless device may receive at least one message from a base station at 2010. The message(s) may comprise configuration parameters of one or more secondary cells.

The wireless device may receive an activation/deactivation media access control control element (A/D MAC CE) at 2020. If up to seven of the one or more secondary cells are each configured with a cell index having a value between one and seven, then the A/D MAC CE may be of a fixed size of one octet and the A/D MAC CE may be identified by a first subheader comprising a first logical channel identifier (LCID). Otherwise, the A/D MAC CE may be of a fixed size of four octets and the A/D MAC CE may be identified by a second subheader comprising a second LCID different from the first LCID.

The wireless device may activate and/or deactivate at least one secondary cell in the one or more secondary cells at 2030 according to the A/D MAC CE. According to an embodiment, a bit in the A/D MAC CE may indicate an activation/deactivation status of a corresponding secondary cell when the corresponding secondary cell is configured. According to an embodiment, the wireless device may ignore a bit in the A/D MAC CE when a corresponding secondary cell is not configured. According to an embodiment, a bit in the A/D MAC CE may indicate that a corresponding secondary cell is activated when the bit is set to one and the corresponding secondary cell is configured. According to an embodiment, a bit in the A/D MAC CE may indicate that a corresponding secondary cell is deactivated when the bit is set to zero and the corresponding secondary cell is configured.

According to an embodiment, the first LCID and the second LCID may each have a length of five bits. According to an embodiment, the first subheader may have a size of one octet and comprise the first LCID. According to an embodiment, the second subheader may have a size of one octet and comprises the second LCID. According to an embodiment, the first subheader and the second subheader may not include a length field. According to an embodiment, the second LCID may be employed when more than seven of the one or more secondary cells are configured.

According to an embodiment, a wireless device may receive at least one message comprising configuration parameters of one or more secondary cells at 2010. The wireless device may receive an activation/deactivation media access control control element (A/D MAC CE) at 2020. If the configuration parameters meet a first criterion, then the A/D MAC CE may be of a fixed size of one octet and the A/D MAC CE may be identified by a first subheader comprising a first logical channel identifier (LCID). Otherwise, the A/D MAC CE may be of a fixed size of four octets and the A/D MAC CE may be identified by a second subheader with a second LCID different from the first LCID. According to an embodiment, the first LCID and the second LCID may each have a length of five bits. According to an embodiment, the first subheader may have a size of one octet and comprise the first LCID. According to an embodiment, the second subheader may have a size of one octet and comprise the second LCID. According to an embodiment, the first subheader and the second subheader may not include a length field. According to an embodiment, the second LCID may be employed when more than seven of the one or more secondary cells are configured.

At 2030, the wireless device may activate and/or deactivating at least one secondary cell in the one or more secondary cells according to the A/D MAC CE. According to an embodiment, a bit in the A/D MAC CE may indicate an activation/deactivation status of a corresponding secondary cell when the corresponding secondary cell is configured. According to an embodiment, the wireless device may ignore a bit in the A/D MAC CE when a corresponding secondary cell is not configured. According to an embodiment, a bit in the A/D MAC CE may indicate that a corresponding secondary cell is activated when the bit is set to one and the corresponding secondary cell is configured. According to an embodiment, a bit in the A/D MAC CE may indicate that a corresponding secondary cell is deactivated when the bit is set to zero and the corresponding secondary cell is configured.

Figure 21:
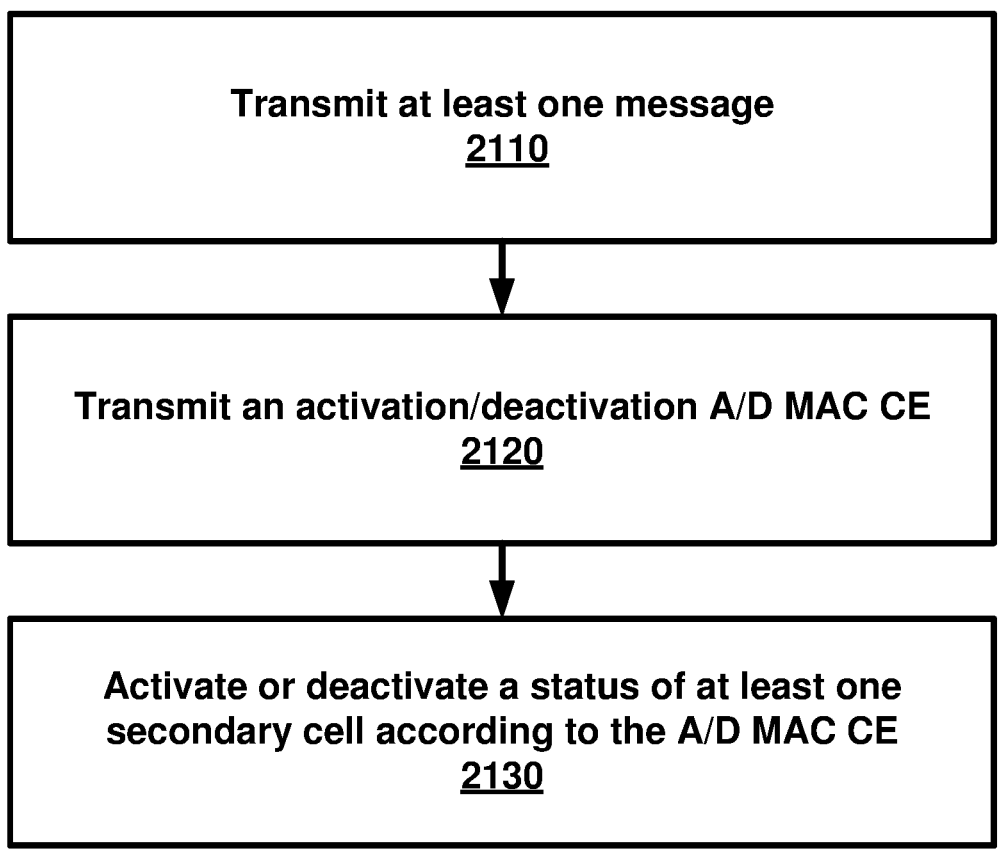
FIG. 21 is an example flow diagram as per an aspect of an embodiment of the present invention.

FIG. 21 is an example flow diagram as per an aspect of an embodiment of the present invention. A base station may transmit at least one message to a wireless device at 2110. The message(s) may comprise configuration parameters of one or more secondary cells.

At 2120, the base station may transmit an activation/deactivation media access control control element (A/D MAC CE). If up to seven of the one or more secondary cells are each configured with a cell index having a value between one and seven, then the A/D MAC CE may be of a fixed size of one octet and the A/D MAC CE may be identified by a first subheader comprising a first logical channel identifier (LCID). Otherwise, the A/D MAC CE may be of a fixed size of four octets and the A/D MAC CE may be identified by a second subheader with a second LCID different from the first LCID. According to an embodiment, the first LCID and the second LCID may each have a length of five bits. According to an embodiment, the first subheader may have a size of one octet and may comprise the first LCID. According to an embodiment, the second subheader may have a size of one octet and may comprise the second LCID. According to an embodiment, the first subheader and the second subheader may not include a length field. According to an embodiment, the second LCID may be employed when more than seven of the one or more secondary cells are configured.

At 2130, the base station may activate and/or deactivate a status of at least one secondary cell in the one or more secondary cells according to the A/D MAC CE. According to an embodiment, a bit in the A/D MAC CE may indicate an activation/deactivation status of a corresponding secondary cell when the corresponding secondary cell is configured. According to an embodiment, the wireless device may ignore a bit in the A/D MAC CE when a corresponding secondary cell is not configured. According to an embodiment, a bit in the A/D MAC CE may indicate that a corresponding secondary cell is activated when the bit is set to one and the corresponding secondary cell is configured.

Figure 22:
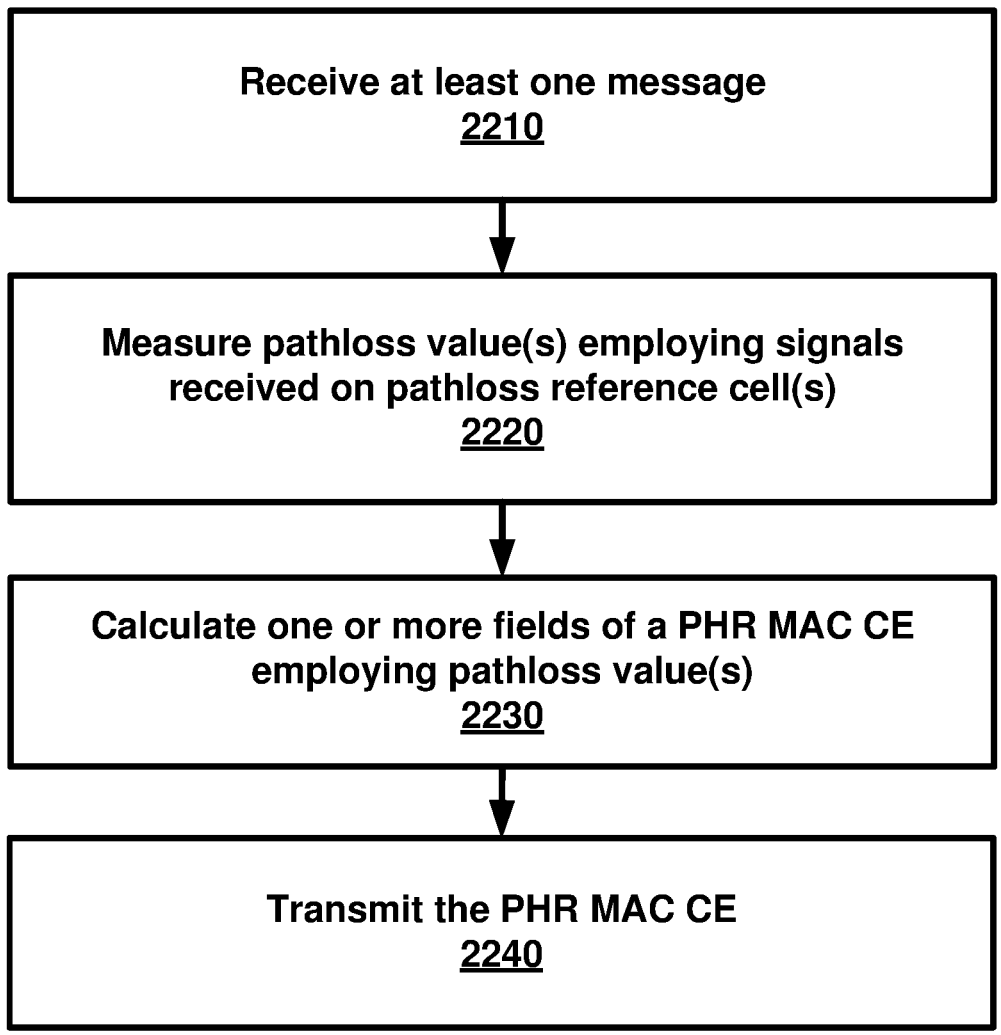
FIG. 22 is an example flow diagram as per an aspect of an embodiment of the present invention.

FIG. 22 is an example flow diagram as per an aspect of an embodiment of the present invention. A wireless device may receive at least one message from a base station at 2210. The message(s) may comprise configuration parameters of one or more secondary cells. According to an embodiment, the one or more secondary cells may comprise a secondary physical uplink control channel (PUCCH) secondary cell.

At 2220, the wireless device may measure one or more pathloss values employing signals received on one or more pathloss reference cells. At 2230, the wireless device may calculate one or more fields of a power headroom report media access control control element (PHR MAC CE) employing the one or more pathloss values.

The wireless device may transmit the PHR MAC CE at 2240. The PHR MAC CE may comprise a presence field. The presence field may comprise a plurality of presence bits. The presence field may be of a fixed size of one octet if up to seven of the one or more secondary cells are each configured with a cell index having a value between one and seven. The presence field may be of a fixed size of four octets if the one or more secondary cells comprise more than seven secondary cells with configured uplinks.

According to an embodiment, the PHR MAC CE may be identified by a subheader. The subheader may comprise a logical channel identifier (LCID) field and a length field.

According to an embodiment, a bit in the presence field may indicate whether one or more power headroom fields are present for a corresponding secondary cell. According to an embodiment, the wireless device may set a bit in the presence field to zero when a corresponding secondary cell is not configured. According to an embodiment, a bit in the presence field may indicate that one or more power headroom fields are present for a corresponding secondary cell when the bit is set to one. According to an embodiment, a bit in the presence bits may indicate that no power headroom field is present for a corresponding secondary cell when the bit is set to zero. According to an embodiment, the one or more fields may comprise one or more Type 1 power headroom fields and/or one or more Type 2 power headroom fields.

Figure 23:
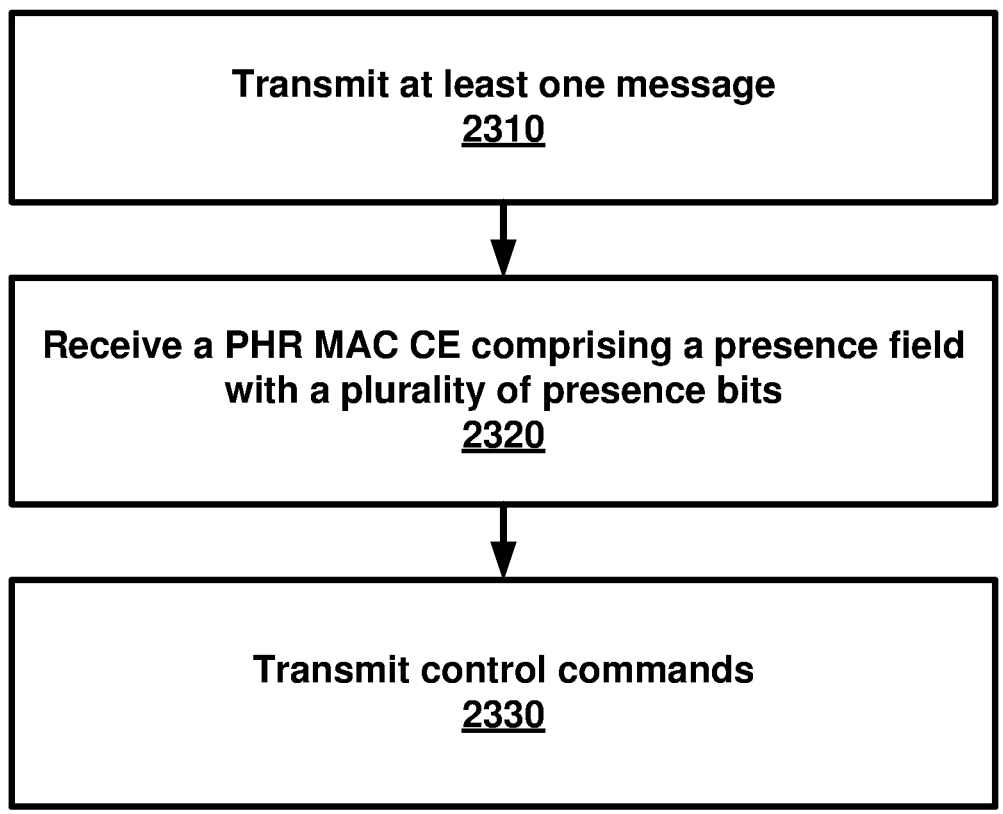
FIG. 23 is an example flow diagram as per an aspect of an embodiment of the present invention.

FIG. 23 is an example flow diagram as per an aspect of an embodiment of the present invention. A bas station may transmit at least one message to a wireless device at 2310. The message(s) may comprise configuration parameters of one or more secondary cells. According to an embodiment, the one or more secondary cells may comprise a secondary physical uplink control channel (PUCCH) secondary cell.

At 2320, the base station may receive a power headroom report media access control control element (PHR MAC CE) comprising a presence field. The presence field may comprise a plurality of presence bits. The presence field may be of a fixed size of one octet if up to seven of the one or more secondary cells are each configured with a cell index having a value between one and seven. The presence field may be of a fixed size of four octets if the one or more secondary cells comprise more than seven secondary cells with configured uplinks. According to an embodiment, the PHR MAC CE may be identified by a subheader. The subheader may comprise a logical channel identifier (LCID) field and a length field. According to an embodiment, a bit in the presence field may indicate whether one or more power headroom fields are present for a corresponding secondary cell. According to an embodiment, the base station may ignore a bit in the presence field when a corresponding secondary cell is not configured. According to an embodiment, a bit in the presence field may indicate that one or more power headroom fields are present for a corresponding secondary cell when the bit is set to one. According to an embodiment, a bit in the presence field may indicate that no power headroom field is present for a corresponding secondary cell when the bit is set to zero. According to an embodiment, the PHR MAC CE may comprise one or more Type 1 power headroom fields and/or one or more Type 2 power headroom fields.

At 2330, the base station may transmit one or more control commands on (e)PDCCH (e.g. DCI comprising one or more power control commands) employing at least the PHR MAC CE to the wireless device. The control commands may comprise downlink control information (DCI) transmitted on (e)PDCCH. PHR MAC CE includes information about the available power headroom for active cells with a configured uplink. This may allow the eNB to determine how much power the UE may utilize on active cells for uplink power transmission in the subframe for which PHR is calculated. The eNB may employ this information for uplink scheduling, resource allocation, transmission format/MCS determination, and/or power control command transmission to the UE.

In an example embodiment, a wireless device may receive at least one message comprising configuration parameters of one or more secondary cells. The wireless device may receive an activation/deactivation media access control control element (A/D MAC CE).

In an example, if/when the configuration parameters meet a first criterion, then the A/D MAC CE is of a first format, otherwise, the A/D MAC CE is of a second format. For example, the first criterion is met if up to seven of the one or more secondary cells are each configured with a cell index having a value between one and seven, otherwise, the second criterion is met. For example, if up to seven of the one or more secondary cells are each configured with a cell index having a value between one and seven, then the A/D MAC CE is of a fixed size of one octet, otherwise, the A/D MAC CE is of a fixed size of four octet.

In an example, if/when the configuration parameters meet the first criterion, then the A/D MAC CE is identified by a first subheader comprising a first logical channel identifier (LCID), otherwise, the A/D MAC CE is identified by a second subheader with a second LCID different from the first LCID. For example, the first criterion is met if up to seven of the one or more secondary cells are each configured with a cell index having a value between one and seven, otherwise, the second criterion is met. For example, if up to seven of the one or more secondary cells are each configured with a cell index having a value between one and seven, then identified by the first subheader comprising the first logical channel identifier (LCID), otherwise, the A/D MAC CE is identified by the second subheader with the second LCID different from the first LCID.

The wireless device may activate or deactivate at least one secondary cell in the one or more secondary cells according to the A/D MAC CE.

In an example embodiment, a wireless device may receive at least one message comprising configuration parameters of one or more secondary cells. The wireless device transmits a PHR MAC CE. The PHR MAC CE comprises a presence field comprising a plurality of presence bits. The presence field is of a fixed size of one octet when the configuration parameters meet a first criterion. The presence field is of a fixed size of four octets when the configuration parameters meet a second criterion. For example, the presence field is of a fixed size of one octet when up to seven of the one or more secondary cells are each configured with a cell index having a value between one and seven and PUCCH secondary cell is not configured. In an example, the presence field may be of a fixed size of four octets when the one or more secondary cells comprise more than seven secondary cells with configured uplinks. In an example, the presence field may be of a fixed size of four octets when a secondary PUCCH is configured.

The wireless device may measure one or more pathloss values employing signals received on one or more pathloss reference cells. The wireless device may calculate one or more fields of a PHR MAC CE employing the one or more pathloss values. The base station may transmit one or more control commands employing at least the PHR MAC CE. The control commands may be transmitted on a physical downlink control channel.

With regard to carrier aggregation, the configured set of serving cells for a UE may consists of one PCell and one or more SCells. If DC is not configured, one additional PUCCH may be configured on an SCell, the PUCCH SCell. When a PUCCH SCell is configured, an RRC may configure the mapping of serving cell(s) to a Primary PUCCH group and/or a Secondary PUCCH group (e.g., for each SCell, whether the PCell and/or the PUCCH SCell is employed for the transmission of ACK/NAKs and/or CSI reports).

With regard to power headroom, if the UE transmits a PUSCH without PUCCH in subframe i for serving cell c, power headroom for a Type 1 report may be computed employing $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} [dB]$$

For extendedPHR, the Extended Power Headroom Report (PHR) MAC control element may be identified by a MAC PDU subheader with an LCID. It may have a variable size. When a Type 2 PH is reported, the octet containing the Type 2 PH field may be included first after the octet indicating the presence of PH per SCell and followed by an octet containing the associated PCMAX,c field (if reported). Following in ascending order based on the ServCellIndex may be an octet with the Type 1 PH field and an octet with the associated PCMAX,c field (if reported), for the PCell and for each SCell indicated in the bitmap.

For extendedPHR2, the Extended Power Headroom Report (PHR) MAC control elements may be identified by a MAC PDU subheader with an LCID. They may have variable sizes and. One octet with C fields may be employed to indicate the presence of PH per SCell when the highest SCellIndex of SCell with configured uplink is less than 8, otherwise four octets may be employed. When Type 2 PH is reported for the PCell, the octet containing the Type 2 PH field may be included first after the octet(s) indicating the presence of PH per SCell and followed by an octet containing the associated PCMAX,c field (if reported). The Type 2 PH field for the PUCCH SCell may follow (if PUCCH on SCell is configured and Type 2 PH is reported for the PUCCH SCell), followed by an octet containing the associated PCMAX,c field (if reported). Then following in ascending order based on the ServCellIndex may be an octet with the Type 1 PH field and an octet with the associated PCMAX,c field (if reported), for the PCell and for each SCell indicated in the bitmap.

Figure 14B:
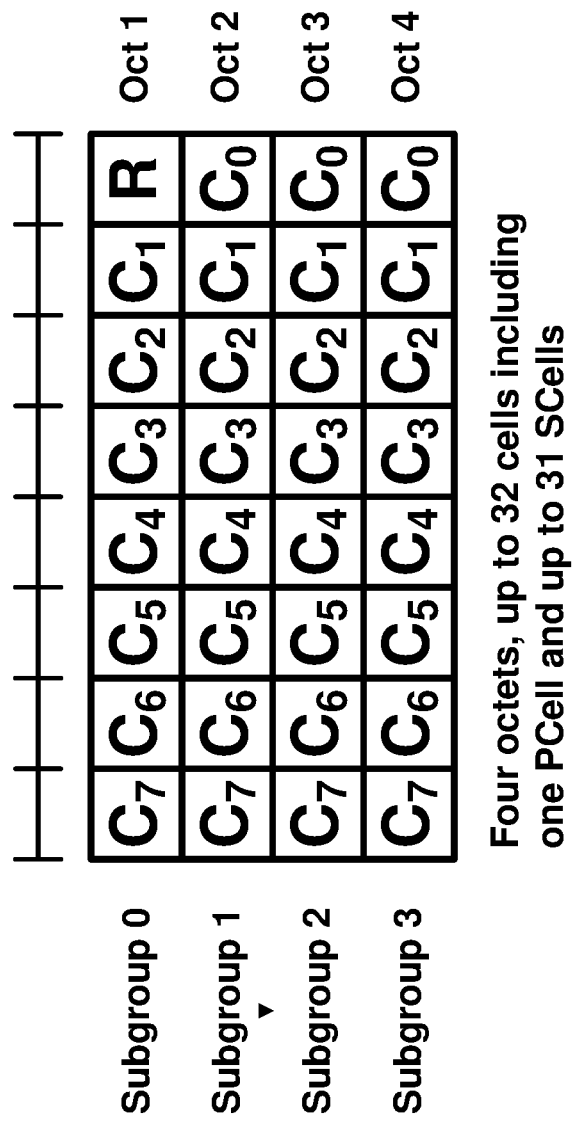

The Extended PHR MAC Control Elements may be defined. A Ci field may indicate the presence of a PH field for the SCell with SCellIndex i. The Ci field set to "1" may indicate that a PH field for the SCell with SCellIndex i is reported. The Ci field set to "0" may indicates that a PH field for the SCell with SCellIndex i is not reported;

The Activation/Deactivation MAC control element of one octet may be identified by a MAC PDU subheader with an LCID. It may have a fixed size and comprise of a single octet containing seven C-fields and one R-field. The Activation/Deactivation MAC control element with one octet may be defined, for example, as shown in FIG. 14A and FIG. 14B. The Activation/Deactivation MAC control element of four octets may be identified by a MAC PDU subheader with LCID. It may have a fixed size and may comprise of a four octets containing 31 C-fields and one R-field. The Activation/Deactivation MAC control element of four octets may be defined, for example with index value 11000 correlating with an LCID value of Activation/Deactivation (4 octets) and index value 11011 correlating an LCID value of Activation/Deactivation (1 octet).

For a case with no serving cell with a ServCellIndex larger than 7, an Activation/Deactivation MAC control element of one octet may be applied, otherwise an Activation/Deactivation MAC control element of four octets may be applied. If there is an SCell configured with SCellIndex i, a Ci field may indicate the activation/deactivation status of the SCell with SCellIndex i, else the MAC entity may ignore the Ci field. The Ci field may be set to "1" to indicate that the SCell with SCellIndex i may be activated. The Ci field may be set to "0" to indicate that the SCell with SCellIndex i may be deactivated. R may comprise a reserved bit that may be set to "0".

If a MAC entity receives an Activation/Deactivation MAC control element in a TTI activating the SCell, the MAC entity may activate the SCell. The activation of the SCell may apply normal SCell operation(s) including: SRS transmissions on the SCell; CQI/PMI/RI/PTI reporting for the SCell; PDCCH monitoring on the SCell; PDCCH monitoring for the SCell; and PUCCH transmissions on the SCell, if configured. The MAC entity may start and/or restart the sCellDeactivationTimer associated with the SCell. The MAC entity may trigger PHR.

Otherwise, if the MAC entity receives an Activation/Deactivation MAC control element in the TTI deactivating the SCell; or if the sCellDeactivationTimer associated with the activated SCell expires in the TTI: in the TTI, the MAC may: deactivate the SCell; stop the sCellDeactivationTimer associated with the SCell; and/or flush HARQ buffers associated with the SCell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:
1. A base station comprising:
one or more processors; and
memory storing instructions that, when executed by the one or more processors, cause the base station to:
  transmit at least one message comprising:
    configuration parameters of one or more secondary cells; and
    at least one information element indicating that a first type of extended power headroom is configured, wherein the at least one information element is configured as setup when a secondary cell in the one or more secondary cells is configured with a physical uplink control channel;
  receive a power headroom report comprising a presence field, wherein:
    the presence field is of a fixed size of one octet when up to seven secondary cells are configured for a wireless device, each cell in the one or more secondary cells having a cell index with a value between one and seven; and
    the presence field is of a fixed size of four octets when the one or more secondary cells comprise more than seven secondary cells with configured uplinks; and
  transmit one or more control commands based on the power headroom report.

2. The base station of claim 1, wherein the power headroom report is identified by a subheader comprising a logical channel identifier field and a length field.

3. The base station of claim 1, wherein a bit in the presence field indicates whether one or more power headroom fields are present for a corresponding secondary cell.

4. The base station of claim 1, wherein a bit in the presence field indicates that no power headroom field is present for a corresponding secondary cell when the bit is set to zero.

5. The base station of claim 1, wherein a bit in the presence field indicates that one or more power headroom fields are present for a corresponding secondary cell when the bit is set to one.

6. The base station of claim 1, wherein the one or more secondary cells comprise a physical uplink control channel (PUCCH) secondary cell.

7. The base station of claim 1, wherein the power headroom report comprises one or more Type 1 power headroom fields and one or more Type 2 power headroom fields.

8. A method comprising:
receiving, by a wireless device from a base station, at least one message comprising:
configuration parameters of one or more secondary cells; and
at least one information element indicating that a first type of extended power headroom is configured, wherein the at least one information element is configured as setup when a secondary cell in the one or more secondary cells is configured with a physical uplink control channel;
transmitting a power headroom report comprising a presence field, wherein:
the presence field is of a fixed size of one octet when up to seven secondary cells are configured in the wireless device, each cell in the one or more secondary cells having a cell index with a value between one and seven; and
the presence field is of a fixed size of four octets when the one or more secondary cells comprise more than seven secondary cells with configured uplinks; and
receiving, from the base station, one or more control commands based on the power headroom report.

9. The method of claim 8, wherein the power headroom report is identified by a subheader comprising a logical channel identifier field and a length field.

10. The method of claim 8, wherein a bit in the presence field indicates whether one or more power headroom fields are present for a corresponding secondary cell.

11. The method of claim 8, wherein a bit in the presence field indicates that one or more power headroom fields are present for a corresponding secondary cell when the bit is set to one.

12. The method of claim 8, wherein the one or more secondary cells comprise a physical uplink control channel (PUCCH) secondary cell.

13. The method of claim 8, wherein the power headroom report comprises one or more Type 1 power headroom fields and one or more Type 2 power headroom fields.

14. A wireless device comprising:
one or more processors; and
memory storing instructions that, when executed by the one or more processors, cause the wireless device to:
receive, from a base station, at least one message comprising:
configuration parameters of one or more secondary cells; and
at least one information element indicating that a first type of extended power headroom is configured, wherein the at least one information element is configured as setup when a secondary cell in the one or more secondary cells is configured with a physical uplink control channel;
transmit a power headroom report comprising a presence field, wherein:
the presence field is of a fixed size of one octet when up to seven secondary cells are configured in the wireless device, each cell in the one or more secondary cells having a cell index with a value between one and seven; and
the presence field is of a fixed size of four octets when the one or more secondary cells comprise more than seven secondary cells with configured uplinks; and
receive, from the base station, one or more control commands based on the power headroom report.

15. The wireless device of claim 14, wherein the power headroom report is identified by a subheader comprising a logical channel identifier field and a length field.

16. The wireless device of claim 14, wherein a bit in the presence field indicates whether one or more power headroom fields are present for a corresponding secondary cell.

17. The wireless device of claim 14, wherein a bit in the presence field indicates that one or more power headroom fields are present for a corresponding secondary cell when the bit is set to one.

18. The wireless device of claim 14, wherein the one or more secondary cells comprise a physical uplink control channel (PUCCH) secondary cell.

19. The wireless device of claim 14, wherein the power headroom report comprises one or more Type 1 power headroom fields and one or more Type 2 power headroom fields.

20. The wireless device of claim 14, wherein a bit in the presence field indicates that no power headroom field is present for a corresponding secondary cell when the bit is set to zero.

* * * * *